United States Patent [19]

Kobayashi et al.

[11] Patent Number: 5,271,362

[45] Date of Patent: * Dec. 21, 1993

[54] TWO-STROKE ENGINE

[75] Inventors: Tatsuo Kobayashi, Susono; Norihiko Nakamura; Kenichi Nomura, both of Mishima; Hiroshi Nomura; Hiroaki Nihei, both of Susono; Eishi Ohno, Mishima, all of Japan

[73] Assignee: Toyota Jidosha Kabushiki Kaisha, Toyota, Japan

[*] Notice: The portion of the term of this patent subsequent to May 26, 2009 has been disclaimed.

[21] Appl. No.: 719,187

[22] Filed: Jun. 21, 1991

[30] Foreign Application Priority Data

Jun. 27, 1990 [JP] Japan .................. 2-166880
Sep. 4, 1990 [JP] Japan .................. 2-232375

[51] Int. Cl.⁵ .............................. F02B 3/04
[52] U.S. Cl. ......................... 123/299; 123/65 VD
[58] Field of Search ........... 123/65 VD, 73 C, 299, 123/300, 276, 305

[56] References Cited

U.S. PATENT DOCUMENTS

| | | | |
|---|---|---|---|
| 3,996,915 | 12/1976 | Demetrescu | 123/297 |
| 4,414,940 | 11/1983 | Loyd | 123/299 |
| 4,543,930 | 10/1985 | Baker | 123/276 |
| 4,811,708 | 3/1989 | Gruden | 123/299 |
| 4,840,147 | 6/1989 | Tanahashi et al. | 123/65 VD |
| 4,945,867 | 8/1990 | Tanahashi et al. | 123/65 VD |
| 4,958,604 | 9/1990 | Hashimoto | 123/276 |
| 5,020,485 | 6/1991 | Watanabe | 123/73 C |
| 5,054,444 | 10/1991 | Morikawa | 123/73 C |
| 5,062,395 | 11/1991 | Tateno | 123/73 C |
| 5,063,886 | 11/1991 | Kanamaru et al. | 123/73 C |
| 5,086,737 | 2/1992 | Watanabe et al. | 123/73 C |
| 5,092,287 | 3/1992 | Motoyama et al. | 123/73 C |
| 5,097,811 | 3/1992 | Baumuller | 123/73 C |
| 5,115,776 | 5/1992 | Ohno et al. | 123/299 |
| 5,119,780 | 6/1992 | Ariga | 123/73 C |

FOREIGN PATENT DOCUMENTS

| | | |
|---|---|---|
| 0299385 | 1/1989 | European Pat. Off. |
| 2424514 | 12/1975 | Fed. Rep. of Germany |
| 3903842 | 9/1989 | Fed. Rep. of Germany |
| 3913586 | 11/1989 | Fed. Rep. of Germany |
| 949642 | 9/1949 | France |
| 51-1816 | 1/1976 | Japan |
| 60-11626 | 6/1985 | Japan |
| 61-173728 | 10/1986 | Japan |
| 62-191622 | 8/1987 | Japan |
| 63-40527 | 3/1988 | Japan |
| 1-124042 | 8/1989 | Japan |
| 1-203613 | 8/1989 | Japan |
| 2-16360 | 1/1990 | Japan |
| 2-28526 | 2/1990 | Japan |
| 2-125911 | 5/1990 | Japan |
| 2-169834 | 6/1990 | Japan |
| 84/02744 | 7/1984 | PCT Int'l Appl. |
| WO-A-87/03043 | 5/1987 | PCT Int'l Appl. |
| WO90/00222 | 1/1990 | PCT Int'l Appl. |
| 723972 | 2/1955 | United Kingdom |

Primary Examiner—David A. Okonsky
Attorney, Agent, or Firm—Oliff & Berridge

[57] ABSTRACT

A two-stroke engine comprising a spark plug arranged at the center of the inner wall of the cylinder head, and a fuel injector arranged on the periphery of the inner wall of the cylinder head. A depression extending from the point beneath the spark plug to the point beneath the tip portion of the fuel injector is formed on the top face of the piston. When the engine is operating under a light load, fuel is injected by the fuel injector only once toward the depression, and conversely, when the engine is operating under an intermediate load, fuel is injected twice. Namely, a first injection is carried out when the piston is at a lower position, and a second injection is carried out when the piston is at a higher position, to thus direct fuel toward the depression.

35 Claims, 24 Drawing Sheets

TWO-STROKE ENGINE

BACKGROUND OF THE INVENTION

1. Field of the Invention

The present invention relates to a two-stroke engine.

2. Description of the Related Art

In a known four-stroke engine which a depression is formed on the top face of the piston, the entire fuel is injected from the fuel injector toward the depression at one time, a swirl motion, swirling about the axis of the cylinder, is created in the combustion chamber, and an ignitable air-fuel mixture is formed around the spark plug due to the swirl motion (see Japanese Unexamined Utility Model application No. 1-124042).

In a two-stroke engine, however, if the entire fuel is injected from the fuel injector toward the depression, as in the above-mentioned four-stroke engine, a problem arises particularly when the engine is operating under an intermediate load.

Namely, in a two-stroke engine, a large amount of burned gas remains in the combustion chamber, and in this case, since the amount of fuel injected by the fuel injector is increased as the engine load Q/N (the amount of air Q fed into the engine cylinder/the engine speed N) becomes higher, the temperature of the combustion gas also increases as the engine load becomes higher. Accordingly, as illustrated by the curved line T in FIG. 19, the temperature of burned gas remaining in the combustion chamber increases as the engine load Q/N becomes higher. Conversely, since the amount of air fed into the engine cylinder is increased as the engine load Q/N becomes higher, the amount of burned gas S remaining in the combustion chamber is reduced as the engine load Q/N becomes higher, as illustrated in FIG. 19. In this case, the thermal energy of the entire burned gas remaining in the combustion chamber is determined by the temperature and the amount of burned gas remaining in the combustion chamber, and consequently, as illustrated by the broken line E in FIG. 19, the thermal energy of the entire burned gas remaining in the combustion chamber reaches a highest level when the engine is operating under an intermediate load, and thus the vaporization of fuel injected by the fuel injector is greatest when the engine is operating under an intermediate load.

Therefore, in a two-stroke engine, if a large amount of fuel is injected by the fuel injector at one time, when the engine is operating under an intermediate load, since the injected fuel is rapidly vaporized, an air-fuel mixture having an approximately stoichiometric air-fuel ratio, which most easily causes self-ignition, is formed before the ignition by the spark plug is carried out, and as a result, a problem occurs in that self-ignition occurs, and thus a combustion noise or knocking occurs.

To avoid this problem, if the injection time is retarded the mixing time of the injected fuel and air becomes short, and therefore, a part of the injected fuel sufficiently mixed with air is created on one hand, and a part of the injected fuel not sufficiently mixed with air is created on the other hand. In this case, since the air-fuel mixture having an approximately stoichiometric air-fuel ratio, which most easily causes self-ignition, is formed by the part of the injected fuel sufficiently mixed with air, a self-ignition or knocking still occurs. Further, since the remaining part of the injected fuel not sufficiently mixed with air is burned in an atmosphere having a low amount of air, a problem arises in that smoke is generated.

If the injection time is further retarded, self-ignition and knocking do not occur, but another problem arises in that a large amount of smoke is generated.

As mentioned above, in a two-stroke engine, if a large amount of fuel is injected by the fuel injector at one time, when the engine is operating under an intermediate load, various problems arise.

SUMMARY OF THE INVENTION

An object of the present invention is to provide a two-stroke engine capable of obtaining a good combustion without the occurrence of self-ignition and knocking, and a generation of smoke.

According to the present invention, there is provided two-stroke engine comprising: a cylinder head having an inner wall; a piston having a top face having therein a depression with a concaved inner wall, the inner wall of the cylinder head and top face of the piston defining a combustion chamber therebetween; at least one intake valve arranged on the runner wall of the cylinder head; at least one exhaust valve arranged on the inner wall of the cylinder head; a spark plug arranged on the inner wall of the cylinder head; injection means for injecting fuel toward the combustion chamber; and control means for controlling an injection time of the injection means in response to an engine load, to carry out only one injection of fuel toward the concaved inner wall of the depression when the engine is operating under a light load, and to carry out two injections of fuel as a first injection and a second injection when the engine is operating under an intermediate load, the first injection being carried out approximately when the exhaust valve is closed, and the second injection being carried out later than the first injection, to direct fuel toward the concaved inner wall of the groove.

The present invention may be more fully understood from the description of preferred embodiments of the invention set forth below, together with the accompanying drawings.

DESCRIPTION OF PREFERRED EMBODIMENTS

Figure 1:
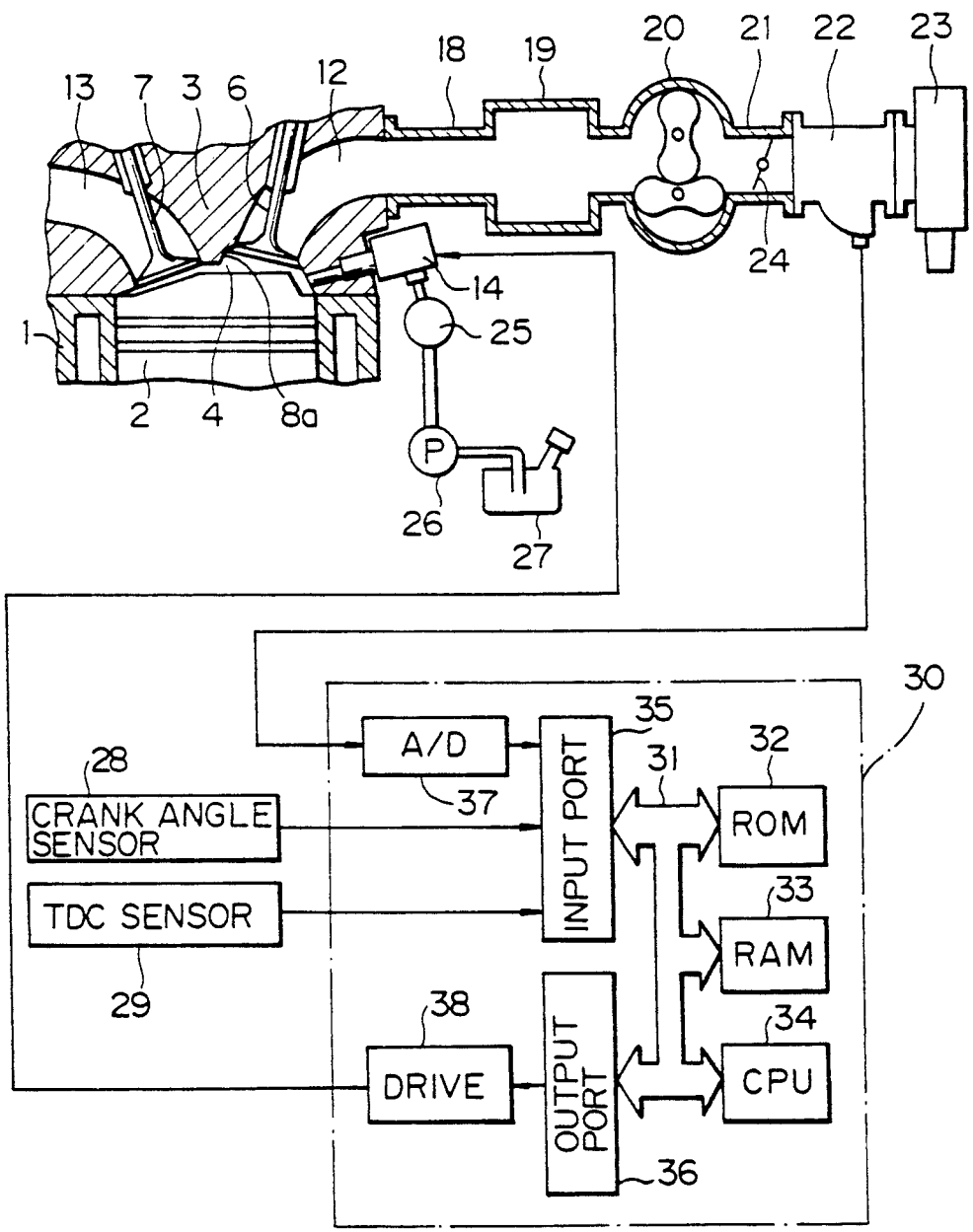
FIG. 1 is a general view of a two-stroke engine.
Figure 2:
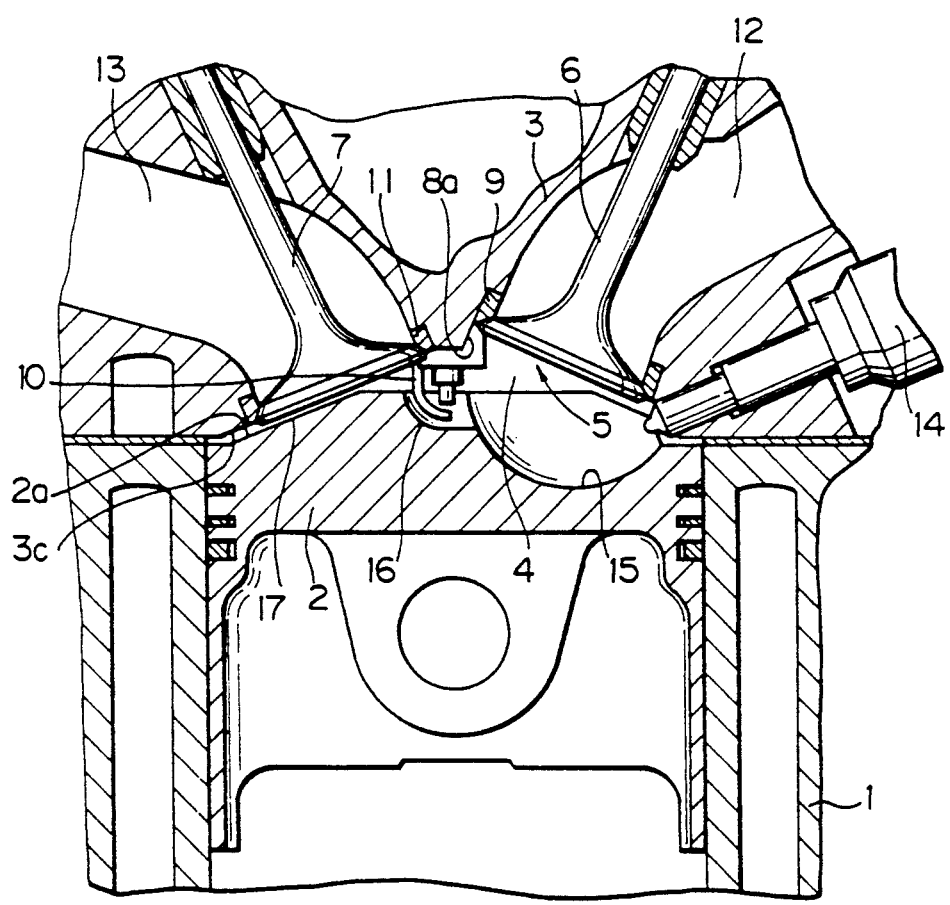
FIG. 2 is a cross-sectional side view of a cylinder of the two-stroke engine.
Figure 3:
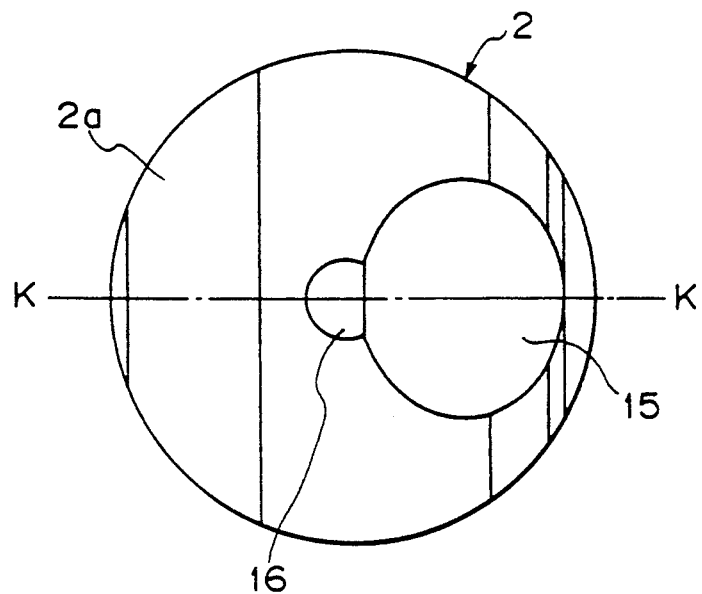
FIG. 3 is a plan view of a piston.
Figure 4:
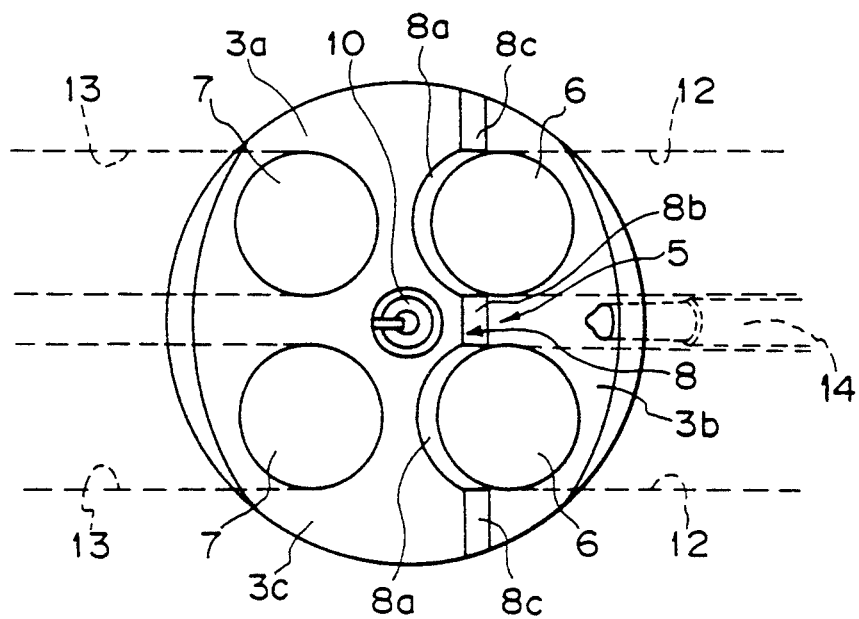
FIG. 4 is a view illustrating an inner wall of a cylinder head.

FIG. 1 illustrates a general view of a two-stroke engine, and FIGS. 2 through 4 illustrate aspects of a cylinder of an engine body of the two-stroke engine.

Referring to FIGS. 1 through 4, reference numeral 1 designates a cylinder block, 2 a piston reciprocally movable in the cylinder block 1, 3 a cylinder head fixed onto the cylinder block 1, and 4 a combustion chamber formed between the inner wall 3a of the cylinder head 3 and the top face of the piston 2. A depression 5 is formed on the inner wall 3a of the cylinder head 3, and a pair of intake valves 6 are arranged on the inner wall portion 3b of the cylinder head 3, which forms the bottom wall of the depression 5. The inner wall portion 3c of the cylinder head 3 other than the depression 5 is substantially flat and inclined, and a pair of exhaust valves 7 are arranged on this inner wall portion 3c of the cylinder head 3. The inner wall portions 3b and 3c of the cylinder head 3 are interconnected via the peripheral wall 8 of the depression 5. The peripheral wall 8 of the depression 5 comprises masking walls 8a arranged as close as possible to the peripheral portions of the corresponding intake valves 6 and extending archwise along the periphery of the corresponding intake valves 6, a fresh air guide wall 8b arranged between the intake valves 6, and fresh air guide walls 8c each arranged between the circumferential wall of the inner wall 3a of the cylinder head 3 and the corresponding intake valve 6. The masking walls 8a extend toward the combustion chamber 4 to a position lower than the intake valves 6 when the valves 6 are in the maximum lift position, and thus the valve opening between the valve seat 9 and the peripheral portion of the intake valve 6, which is located on the exhaust valve side, is masked by the corresponding masking wall 8a for the entire time for which the intake valve 6 is open. The fresh air guide wall 8b and the fresh air guide walls 8c are located on substantially the same plane and extend substantially in parallel to the line passing through the centers of the intake valves 6. The spark plug 10 is arranged on the inner wall portion 3c of the cylinder head 3 in such a manner that it is located at the center of the inner wall 3a of the cylinder head 3. With respect to the exhaust valves 7, no masking walls are provided to cover the openings between the exhaust valves 7 and the valve seats 11. Therefore, when the exhaust valves 7 open, the openings formed between the exhaust valves 7 and the valve seats 11 open as a whole to the inside of the combustion chamber 4.

Intake ports 12 are formed in the cylinder head 3 for the intake valves 6, and exhaust ports 13 are formed in the cylinder head 3 for the exhaust valves 7. A fuel injector 14 is arranged at the periphery of the inner wall 3a of the cylinder head 3, between the intake valves 6, and fuel is injected from the fuel injector 14 toward the combustion chamber 4.

As illustrated in FIGS. 2, and 3, a depression 15 extending from a point substantially beneath the spark plug 10 to a point beneath the tip portion of the fuel injector 14 is formed on the top face of the piston 2. In the embodiment illustrated in FIGS. 2 and 3, the depression 15 has a substantially spherical shape, which is symmetrical with respect to the vertical plane K—K including the spark plug 10 and the fuel injector 14. Further, a recessed portion 16 is formed on the central portion of the top face of the piston 2 and has a spherical shape having a radius of curvature which is smaller than that of the depression 15. The recessed portion 16 is also arranged in the vertical plane K—K and opens to the upper interior of the depression 15. As illustrated in FIG. 2, when the piston 2 reaches top dead center (TDC), the spark plug 16 enters the recessed portion 16. The top face portion 2a of the piston 2 positioned opposite to the depression 15 with respect to the recessed portion 16 is substantially flat and inclined so that, when the piston 2 realizes TDC as illustrated in FIG. 2, a squish area 17 is formed between the inner wall portion 3c of the cylinder head 3 and the top face portion 2a of the piston 2.

As illustrated in FIG. 1, the intake port 12 is connected to a surge tank 19 via a corresponding branch pipe 18. The surge tank 19 is connected to an air cleaner 23 via a mechanically driver supercharger 20 driven by the engine and via an intake duct 21 and an air flow meter 22. A throttle valve 24 is arranged in the intake duct 21. The fuel injector 14 is connected to a reservoir tank 25 for storing high pressure fuel therein, and the reservoir tank 25 is connected to a fuel tank 27 via a fuel feed pump 26. Fuel is pressurized to about 30 MPa by the fuel pump 26 and then fed into the reservoir tank 25, and thus the fuel in the reservoir tank 25 is maintained at a high pressure of about 30 MPa. The opening and closing of the fuel injector 14 is electromagnetically controlled by, for example, the piezoelectric element, and the opening and closing of the fuel injector 14, i.e., the injecting of fuel by the fuel injector 14, is controlled by signals output from an electronic control unit 30.

As illustrated in FIG. 1, the electronic control unit 30 is constructed as a digital computer and comprises a ROM (read only memory) 32, a RAM (random access memory) 33, a CPU (microprocessor etc.) 34, an input port 35 and an output port 36. The ROM 32, the RAM 33, the CPU 34, the input port 35 and the output port 36 are interconnected via a bidirectional bus 31. The air flow meter 22 produces an output voltage proportional to the amount of air Q fed into the engine cylinder, and this output voltage is input into the input port 35 via an AD converter 37. In addition, a crankangle sensor 28 and a TDC sensor 29 are connected to the input port 35. The crankangle sensor 28 produces an output pulse, for example, at each 15 degrees of revolution of the crankshaft of the engine, and the TDC sensor 29 produces an output pulse indicating that, for example, No. 1 cylinder is at the top dead center (TDC). In the electronic control unit 30, the engine speed N is calculated based on the output pulses of the crankangle sensor 28, and the present crank angle i-s calculated on the basis of the output pulses of both the crankangle sensor 28 and the TDC sensor 29. The output port 36 is connected to the fuel injector 14 via a drive circuit 38.

Figure 5:
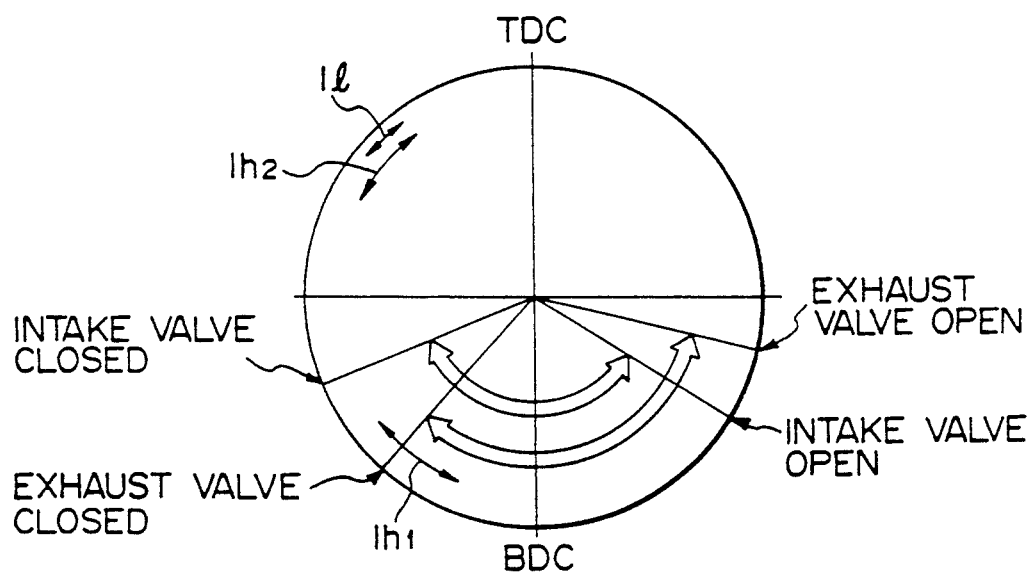
FIG. 5 is a diagram illustrating the opening time of an intake valve and an exhaust valve.

In the embodiment illustrated in FIGS. 1 through 4, as illustrated in FIG. 5, the exhaust valves 7 open earlier than the intake valves 6, and the exhaust valves 7 close earlier than the intake valves 6. In addition, in FIG. 5, $I_l$ indicates an example of the fuel injection time set when the engine is operating under a light load, and $Ih_1$ and $Ih_2$ indicate examples of the fuel injection times set when the engine is operating under an intermediate load and a heavy load. Consequently, it can be understood from FIG. 5 that the fuel injecting operation is carried out twice when the engine is operating under an intermediate load or a heavy load. Furthermore, as illustrated in FIG. 5, when the engine is operating under an intermediate load or a heavy load, the first fuel injection $Ih_1$ is carried out approximately at a time when the exhaust valves 7 are closed, and the fuel injection time $I_l$ under a light load operation of the engine is retarded with respect to the second fuel injection time $Ih_2$ under an intermediate and heavy load operation of the engine.

Figure 6:
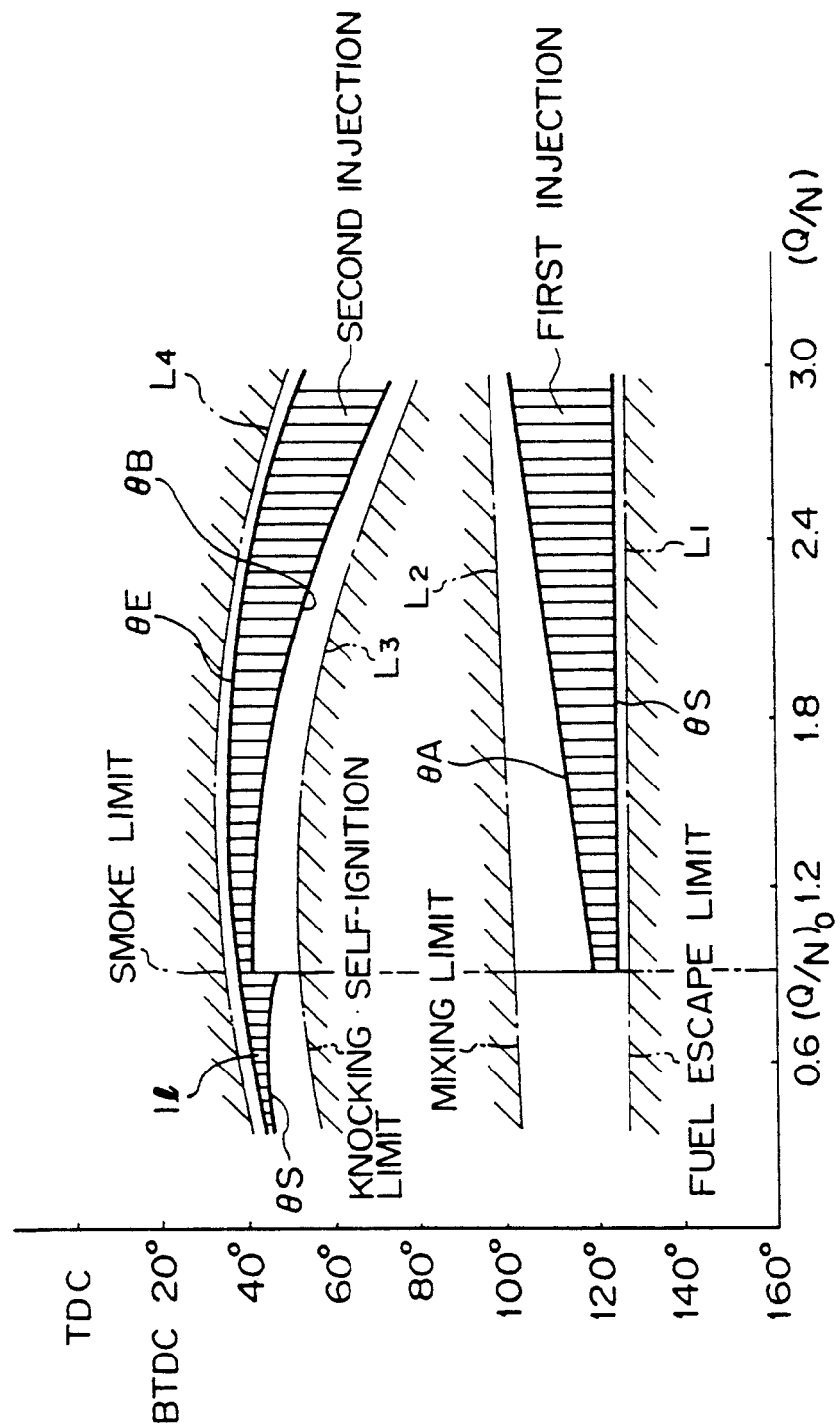
FIG. 6 is a diagram illustrating the injection time.
Figure 7:
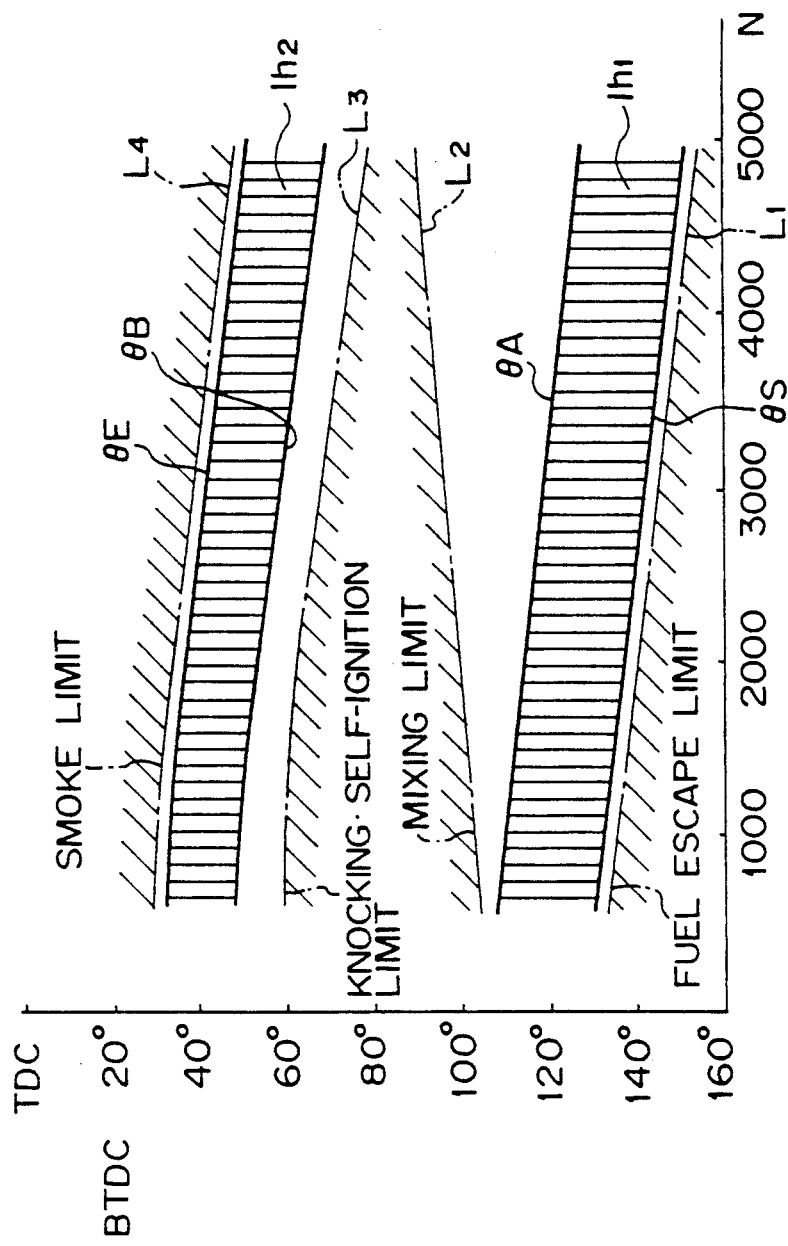
FIG. 7 is a diagram illustrating the injection time.

FIGS. 6 and 7 illustrate the fuel injection time in detail; FIG. 6 illustrates the fuel injection time where the engine load $Q/N$ is changed while maintaining the engine speed N at a constant value, and FIG. 7 illustrates the fuel injection time wherein the engine speed N is changed while maintaining the engine load $Q/N$ at a constant value.

As can be seen from FIG. 6, when the engine is operating under a light load, wherein the engine load $Q/N$ is lower than a fixed engine load $(Q/N)_0$, the fuel injection $I_l$ is carried out only once. At this time, crankangle $l_4$, i.e., along a crankangle which is the fuel injection completion time $\theta E$ of the fuel injection $I_l$ is changed along the smoke limit slightly on the bottom dead center (BDC) side of the smoke limit crankangle $L_4$, and the fuel injection start time $\theta S$ of the fuel injection $I_l$ is determined from the fuel injection completion time $\theta E$. Namely, the fuel injection completion time $\theta E$ is used as a basis for the determination of the fuel injection start time $\theta S$.

Conversely, when the engine is operating under an intermediate load or a heavy load, wherein the engine load $Q/N$ is higher than the fixed engine load $(Q/N)_0$, the fuel injection is carried out twice as illustrated by $Ih_1$ and $Ih_2$. At this time, the fuel injection start time $\theta S$ of the first fuel injection $Ih_1$ is changed along the fuel escape limit crankangle $L_1$, i.e., along a crankangle which is slightly on the TDC side of the fuel escape limit crankangle $L_1$, and the fuel injection completion limit $\theta A$ of the first fuel injection $Ih_1$ is determined from the fuel injection start time $\theta S$ of the first fuel injection $Ih_1$. Namely, the fuel injection start time $\theta S$ is used as a basis for the determination of the fuel injection completion time $\theta A$. In addition, the fuel injection completion time $\theta E$ of the second fuel injection $Ih_2$ is changed along the smoke limit crankangle $L_4$, i.e., along a crankangle which is slightly on the BDC side of the smoke limit crankangle $L_4$, in the same manner as when the engine is operating under a light load, and the fuel injection start time $\theta B$ of the second fuel injection $Ih_2$ is determined by the fuel injection completion time $\theta E$ of the second fuel injection $Ih_2$. Namely, the fuel injection completion time $\theta E$ is used for the determination of the fuel injection start time $\theta B$. Note, when the engine is operating under an intermediate load or a heavy load, the length of the first fuel injection $Ih_1$ and the length of the second fuel injection $Ih_2$ are determined such that the fuel injection completion time $\theta A$ of the first fuel injection $Ih_1$ does not exceed the mixing limit crankangle $L_2$, and that the fuel injection start time $\theta B$ of the second fuel injection $Ih_2$ does not exceed the knocking-self-ignition limit crankangle $L_3$.

Next, the smoke limit, the knocking.self-ignition limit, the mixing limit and the fuel escape limit, illustrated in FIG. 6 and 7 will be described.

If the fuel injection is carried out only once, regardless of the level of the engine load $Q/N$, and the fuel injection completion time $\theta E$ is changed along the smoke limit crankangle $L_4$, the fuel injection start time exceeds the knocking.self-ignition limit crankangle $L_3$ and is advanced toward BDC as the engine load $Q/N$ becomes higher. Nevertheless, if the fuel injection start time exceeds the knocking.self-ignition limit crankangle $L_3$, since the length of time elapsing until the ignition is carried out becomes long after the fuel injection is started, the injected fuel is heated by the burned gas remaining in the combustion chamber 4 and having a high temperature, and thus the injected fuel is sufficiently vaporized. Further, if the entire fuel is injected once when the piston 2 has moved considerably upward, since a large amount of the injected fuel is gathered in a particular small region, a sufficiently vaporized air-fuel mixture having an extremely ignitable density is formed, and as a result, self-ignition occurs before the ignition by the spark plug 10 is carried out, or knocking occurs after the ignition by the spark plug 10 is carried out.

Conversely, if the fuel injection completion time $\theta E$ exceeds the smoke limit crankangle $L_4$, the injected fuel can not be sufficiently vaporized, and therefore, the fuel droplets are baked and smoke is generated. For the above-mentioned reasons, the smoke limit and the knocking.self-ignition limit, as illustrated in FIGS. 6 and 7, exist, and to prevent the generation of smoke and the occurrence of knocking and self-ignition, the fuel injection must be carried out within an injection permissible range of crankangle between the smoke limit and the knocking.self-ignition limit. Therefore, as illustrated in FIG. 6, when the engine is operating under an intermediate load or a heavy load wherein the amount of the injected fuel becomes large, the fuel injection is carried out twice so that the second fuel injection $Ih_2$ can be carried out within the injection permissible crankangle region between the smoke limit and the knocking.self-ignition limit.

Figure 19:
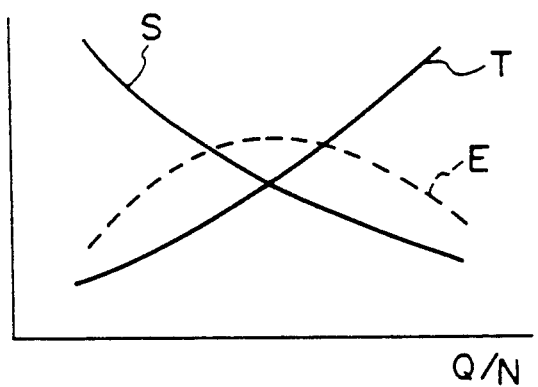
FIG. 19 is a diagram illustrating the thermal energy of the residual burned gas.

As already described with reference to FIG. 19, when the engine is operating under an intermediate load, the thermal energy of the entire burned gas remaining in the combustion chamber 4 reaches a highest level, and thus the injected fuel is most easily vaporized at this time. Consequently, as illustrated in FIG. 6, when the engine is operating under an intermediate load, the smoke limit crankangle $L_4$ and the knocking.self-ignition crankangle $L_3$ are nearest to TDC. In addition, the length of time elapsing until the ignition is carried out after the fuel injection is started becomes shorter as the engine speed N becomes higher. Accordingly, as illustrated in FIG. 7, the smoke limit crankangle $L_4$ and the knocking.self-ignition limit crankangle $L_3$ is gradually changed toward BDC as the engine speed N becomes higher.

Note, if the amount of fuel injection is increased when an accelerating operation of the engine is carried out, the fuel injection start time $\theta B$ of the second fuel injection $Ih_2$ may exceed the knocking self-ignition limit crankangle $L_3$, and thus there is a danger that knocking or self-ignition will occur in this case.

From an air pollution point of view, however, the suppression of the generation of smoke is important, and therefore, while aware of the above danger, the fuel injection completion time $\theta E$ is controlled such that it is changed along the smoke limit crankangle $L_4$ to thereby suppress the generation of smoke.

If the fuel injection operation is carried out twice, the air-fuel mixture formed in the combustion chamber 4 by the first fuel injection $Ih_1$ is very lean. This air-fuel mixture is heated by the residual burned gas having a high temperature, in the combustion chamber 4, but since this air-fuel mixture is very lean, the fuel density is low.

Therefore, even if the first fuel injection $Ih_1$ is carried out early, a self-ignition of this air-fuel mixture cannot occur, and accordingly, there is no danger that self-ignition and knocking will occur.

When considering the combustion caused by this first fuel injection $Ih_1$, it is preferable to vaporize fuel injected at the first fuel injection $Ih_1$ as fast as possible, to obtain a good combustion. This can be achieved by advancing the fuel injection start time $\theta S$ of the first fuel injection $Ih_1$, but is advanced too much the injected fuel escapes into the exhaust port 13. Therefore, to advance the fuel injection start time $\theta S$ of the first fuel injection $Ih_1$ as much as possible, while preventing an escape of the injected fuel into the exhaust port 13, the fuel injection start time $\theta S$ of the first fuel injection $Ih_1$ is controlled such that it is changed along the fuel escape limit crankangle $L_1$. Note, since a certain time must elapse until the injected fuel escapes into the exhaust port 13 after the fuel injection is carried out, the fuel escape crankangle $L_1$ is positioned on the BDC side of the crankangle at which the exhaust valves 7 are closed. In addition, the length of time elapsing until the injected fuel escapes into the exhaust port 13 after the fuel injection is carried out is almost constant, and accordingly, as illustrated in FIG. 7, time fuel escape limit crankangle $L_1$ is changed toward the BDC side as the engine speed N becomes higher. Furthermore, in FIGS. 6 and 7, the mixing limit for obtaining a sufficient mixing of the injected fuel and air is depicted, but the mixing limit crankangle $L_2$ is less clear.

Figure 8A:
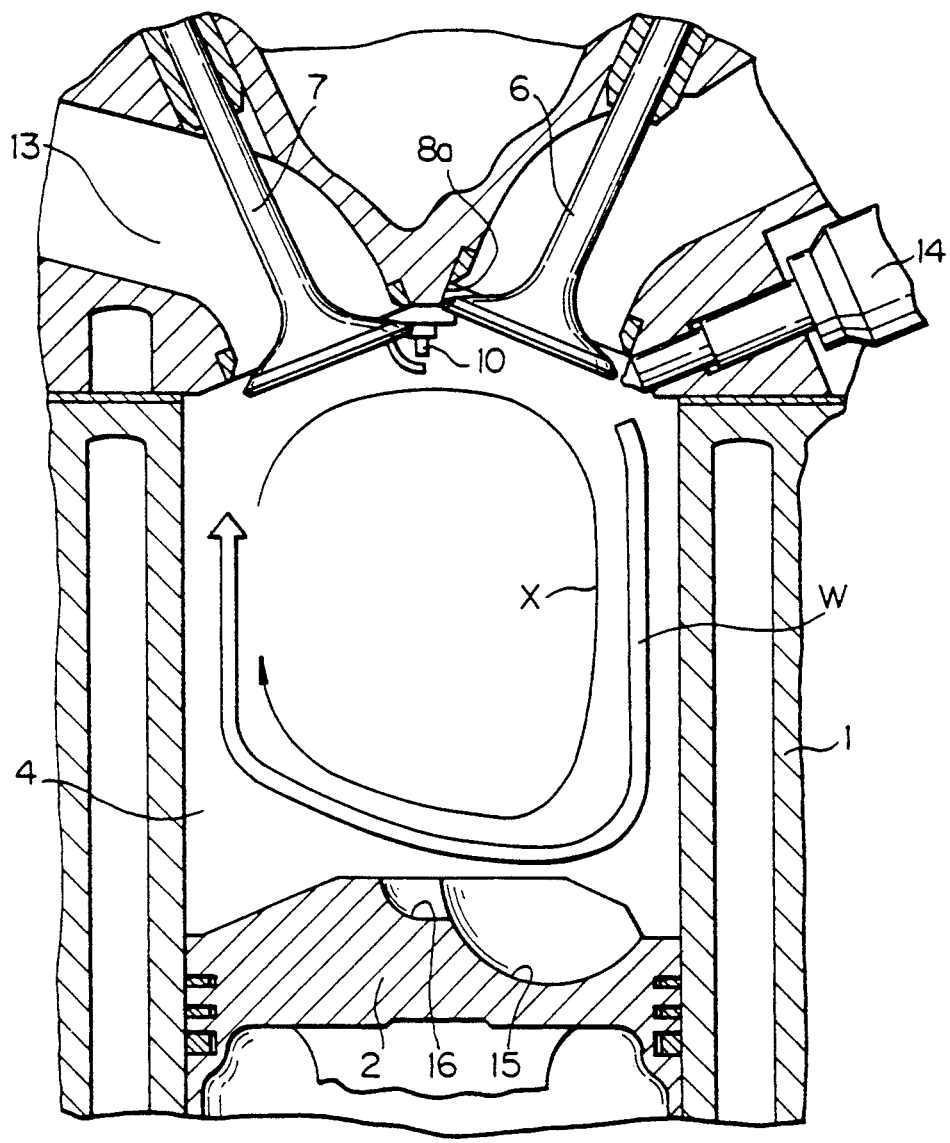
FIGS. 8A through 8F are cross-sectional side views of the engine, illustrating the operation thereof.

As illustrated in FIG. 8A, when the intake valves 6 and the exhaust valves 7 are open, fresh air flows into the combustion chamber 4 via the intake valves 6. At this time, since the valve openings of the intake valves 6, which openings are located on the exhaust valve side, are masked by the masking walls $8a$, the fresh air flows into the combustion chamber 4 from the valve openings of the intake valves 6, which openings are located on the opposite side of the masking walls $8a$. Then, as illustrated by the arrow W in FIG. 8A, the fresh air flows downward along the inner wall of the cylinder, located beneath the intake valves 6 and then moves forward along the top face of the piston 2 and flows upward along the inner wall of the cylinder, located beneath the exhaust valves 7. Thus, the fresh air flows within the combustion chamber 4 in the form of a loop. The burned gas in the combustion chamber 4 is discharged via the exhaust valves 7 by the air stream W flowing in the form of a loop, and a swirl motion X swirling in a vertical plane is created in the combustion chamber 4 by the airstream W flowing in the form of a loop. Then, the piston 2 passes through the bottom dead center and starts to move upward. Thereafter, the injection of fuel by the fuel injector 14 is carried out.

Figure 8B:
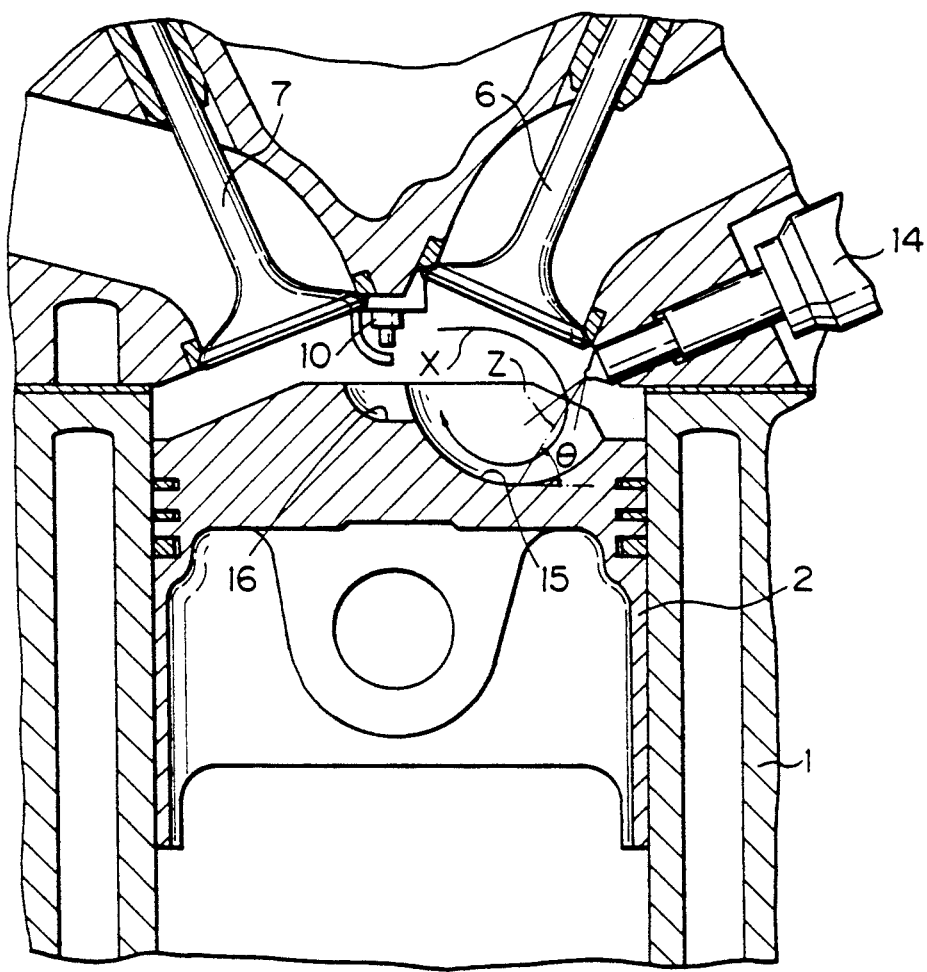
Figure 8C:
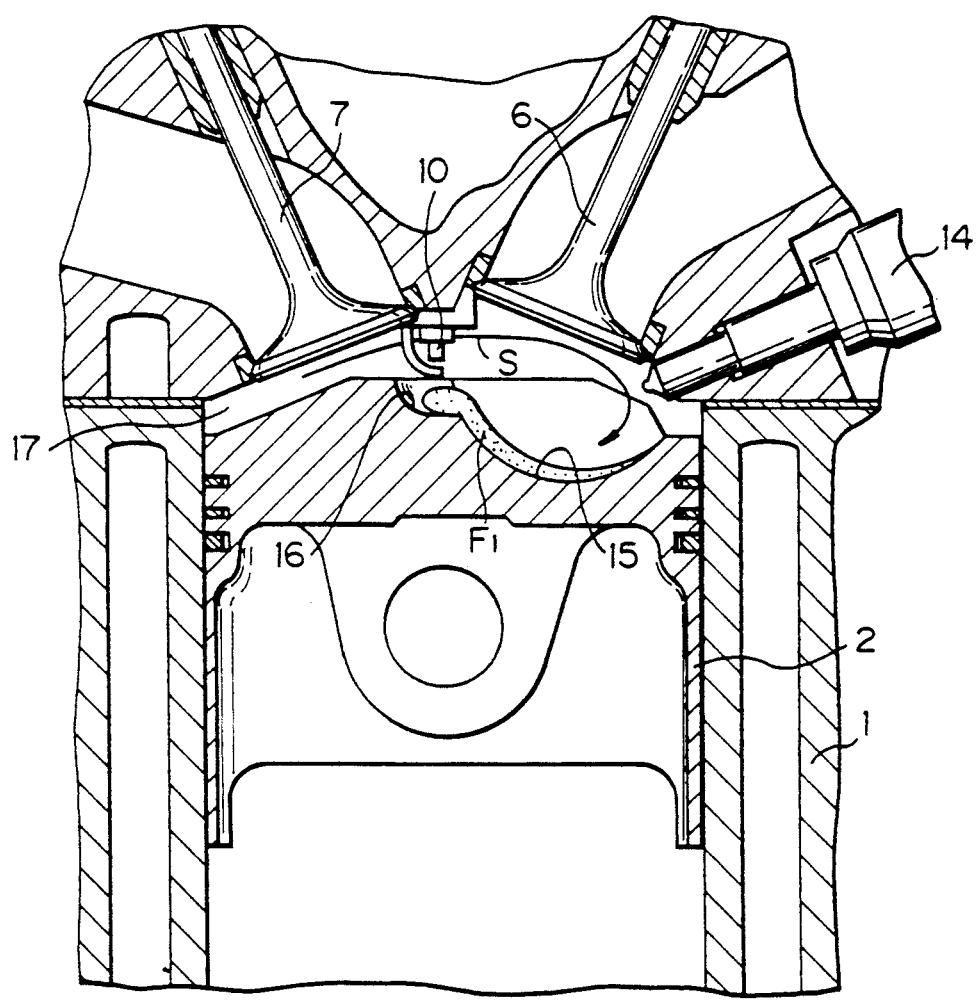
Figure 8D:
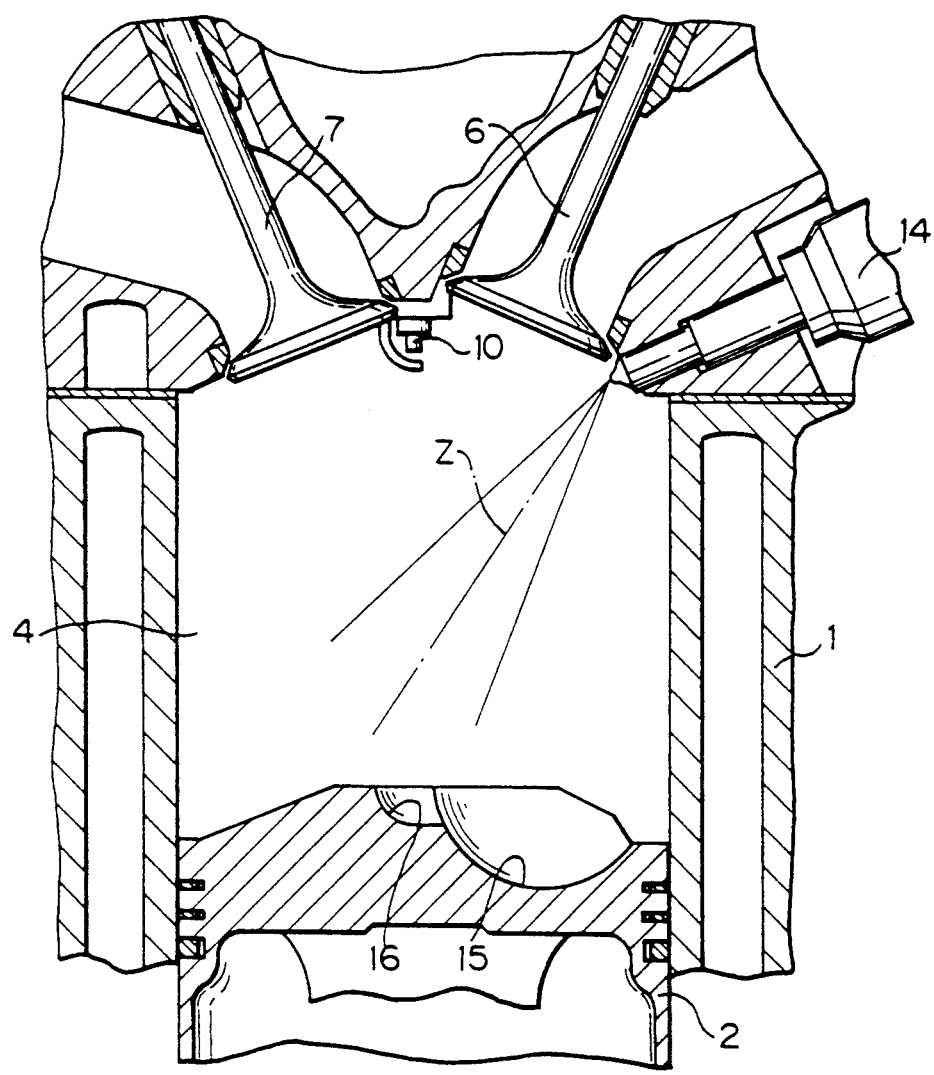
Figure 8E:
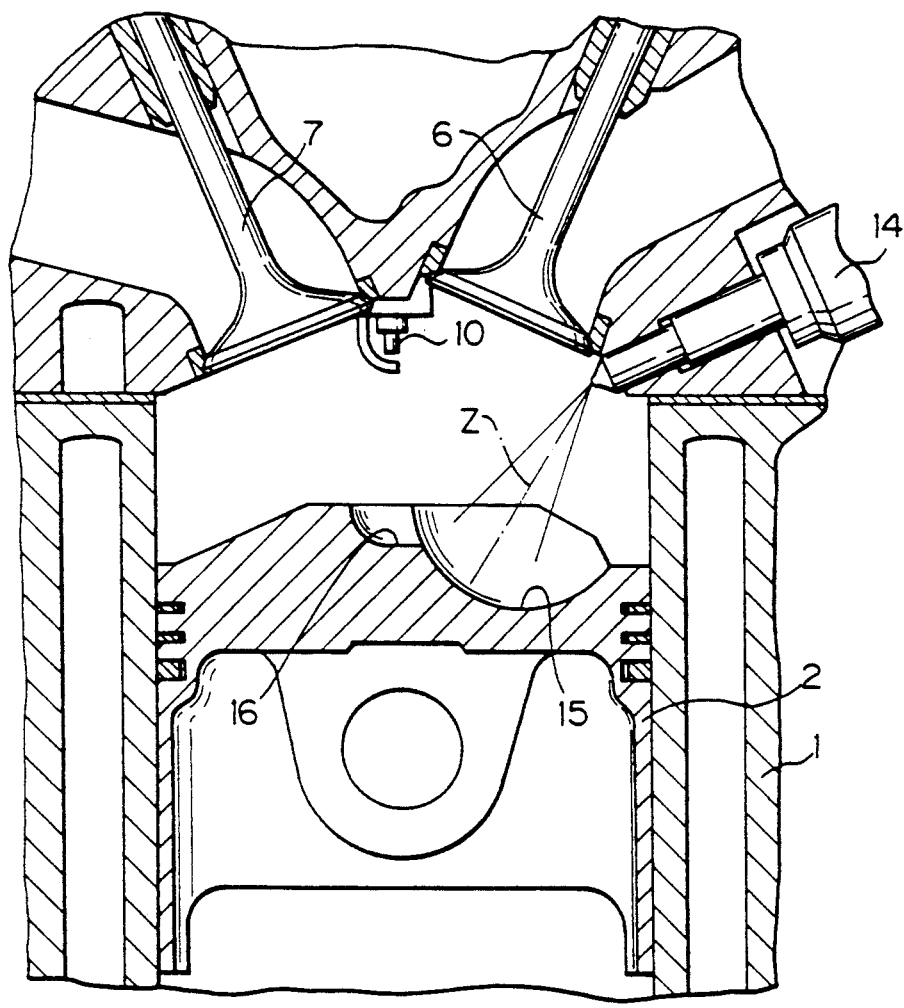
Figure 8F:
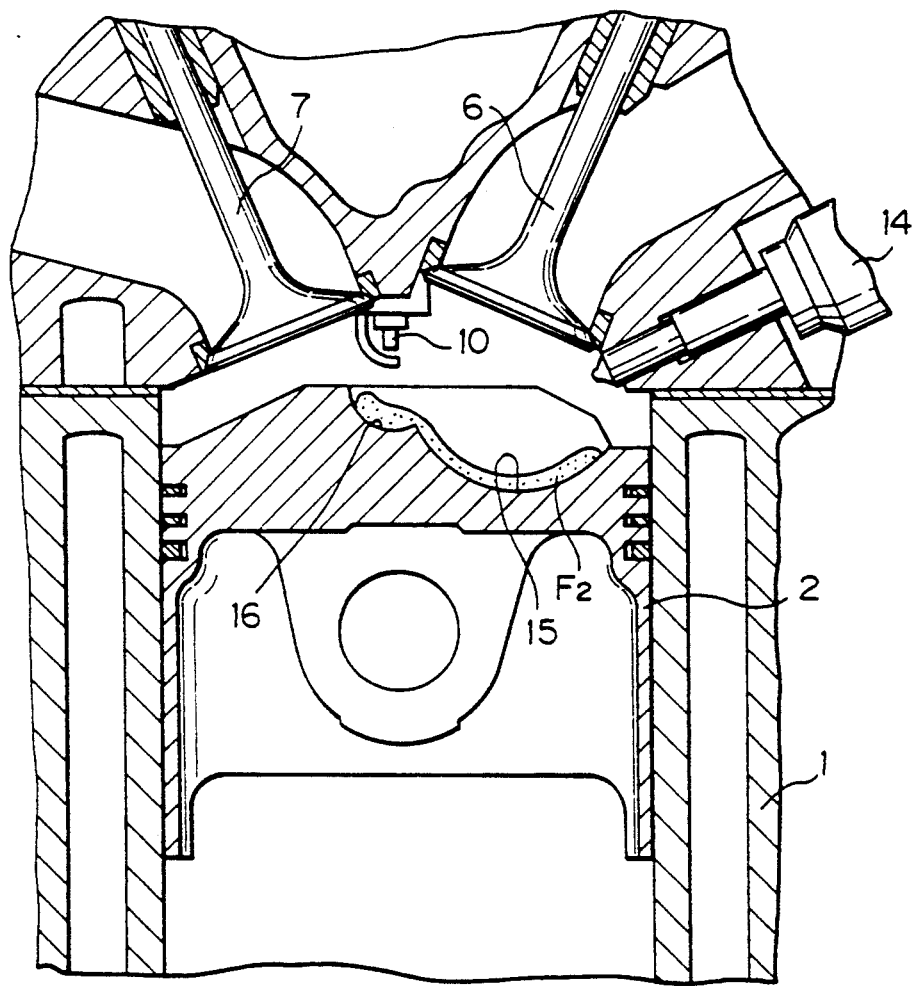

Next, the fuel injection method will be described with reference to FIGS. 8B through 8F. FIGS. 8B and 8C illustrate the case wherein the engine is operating under a light load, and FIGS. 8D, 8E and 8F illustrate the case wherein the engine is operating under an intermediate or a heavy load.

Fuel is injected from the fuel injector 14 toward the concaved inner wall of the depression 15, as illustrated by FIG. 8B. In the embodiment illustrated in FIGS. 1 through 4, the axis of injection Z of the fuel is positioned in the vertical plane K—K illustrated in FIG. 3.

When the engine is operating under a light load, the injected fuel moving forward along the axis of injection Z impinges obliquely upon the concaved inner wall of the depression 15 at an acute angle $\theta$, as illustrated by FIG. 8B. When the injected fuel impinges obliquely upon the concaved inner wall of the depression 15, the fuel moves forward, while being vaporized, to the region beneath the spark plug 10 along the concaved inner wall of the depression 15 due to the inertia thereof, as illustrated by the arrow $F_1$ in FIG. 8C, and the fuel is then introduced into the recessed portion 16. When the engine is operating under a light load, the amount of fuel injected by the fuel injector 14 is small, but at this time, since a large part of the injected fuel is carried to the region beneath the spark plug 10, an ignitable air-fuel mixture is formed around the spark plug 10.

In addition, the swirl motion X created in the combustion chamber 4 as illustrated in FIG. 8A is gradually attenuated, and the radius of the swirl motion X becomes smaller as the piston 2 moves upward. This swirl motion X becomes the swirl motion X, which flows along the concaved inner wall of the depression 15 as illustrated in FIG. 8B, when the piston 2 approaches TDC.

This swirl motion X provides the force which causes the injected fuel to move to the region beneath the spark plug 10. Furthermore, when the piston 2 moves closer to TDC, the squish flow is spouted from the squish area 17 as illustrated by the arrow S in FIG. 8C, and this squish flow S also flows along the concaved inner wall of the depression 15. Consequently, this squish flow S also provides a force which causes the injected fuel to move to the region beneath the spark plug 10. Furthermore, the fuel moving to the region beneath the spark plug 10 along the concaved inner wall of the depression 15 is atomized by the swirl motion X and the squish flow S, and thus an ignitable air-fuel mixture which has been fully atomized is collected around the spark plug 10. Consequently, even when the amount of fuel injected by the fuel injector 14 is small, because the engine is operating under a light load, a good ignition and a subsequent food combustion can be obtained.

As mentioned above, when the engine is operating under an intermediate or a heavy load, the first fuel injection $Ih_1$ is carried out approximately when the exhaust valves 7 are closed. At this time, as illustrated in FIG. 8D, the piston 2 is in a lower position, and thus the injected fuel is caused to impinge upon the wide range of the top face of the piston 2. At this time, the piston 2 is cooled by the injected fuel, but conversely, because the injected fuel is heated by heat from the piston 2, the vaporization of the injected fuel is promoted. Furthermore, at this time, since the strong swirl motion X as illustrated by the arrow X in FIG. 8A is created in the combustion chamber 4, the injected fuel is properly mixed with air, and since the injection time is early, sufficient time is allowed for the injected fuel to be vaporized, and accordingly, a uniform air-fuel mixture is formed in the combustion chamber 4 before the ignition by the spark plug 10 is carried out. Note, since the injection operation of fuel is carried out twice, the air-fuel mixture formed in the combustion chamber 4 by the first fuel injection $Ih_1$ is very lean, and thus a uniform but very lean air-fuel mixture is formed in the combustion chamber 4.

Thereafter, as illustrated in FIG. 8E, the second fuel injection $Ih_2$ is started when the piston 2 is in a lower position than when the engine is operating under a light load. At this time, as illustrated in FIG. 8E, the injected fuel moves forward along the axis of injection Z and impinges upon the concaved inner wall of the depression 15 at substantially a right angle. When the injected fuel impinges upon the concaved inner wall of the depression 15 at substantially a right angle, the fuel spreads along the concaved inner wall of the depression 15 in all directions from the point of impingement of the fuel moving along the axis of injection Z, as illustrated by $F_2$ in FIG. 8F, and in this case, a part of the fuel which has impinged upon the concaved inner wall of the depression 15 moves to the region beneath the spark plug 10 and is then introduced into the recessed portion 16.

As mentioned above, when the amount of fuel injected by the fuel injector 14 is large, because the engine is operating under an intermediate load or a heavy load, since a part of the injected fuel is introduced around the spark plug 10, the air-fuel mixture formed around the spark plug 10 does not become excessively rich, and thus an easily ignitable air-fuel mixture is formed around the spark plug 10. Also, when the engine is operating under an intermediate load or a heavy load, since the injected fuel is distributed on the concaved inner wall of the depression 15, over a wide range thereof, the vaporization of the injected fuel is promoted. In addition, since the fuel injection is carried out twice, the amount of fuel injected into the depression 15 is relatively small, and thus the injected fuel is properly vaporized. Furthermore, when the engine is operating under an intermediate load or a heavy load, both the strong swirl motion X as illustrated in FIG. 8B, and the squish flow S as illustrated in FIG. 8C, are also generated. Namely, the injected fuel $Ih_2$ is properly mixed with air by the swirl motion X and squish flow S, and thus a good combustion can be obtained.

Figure 9:
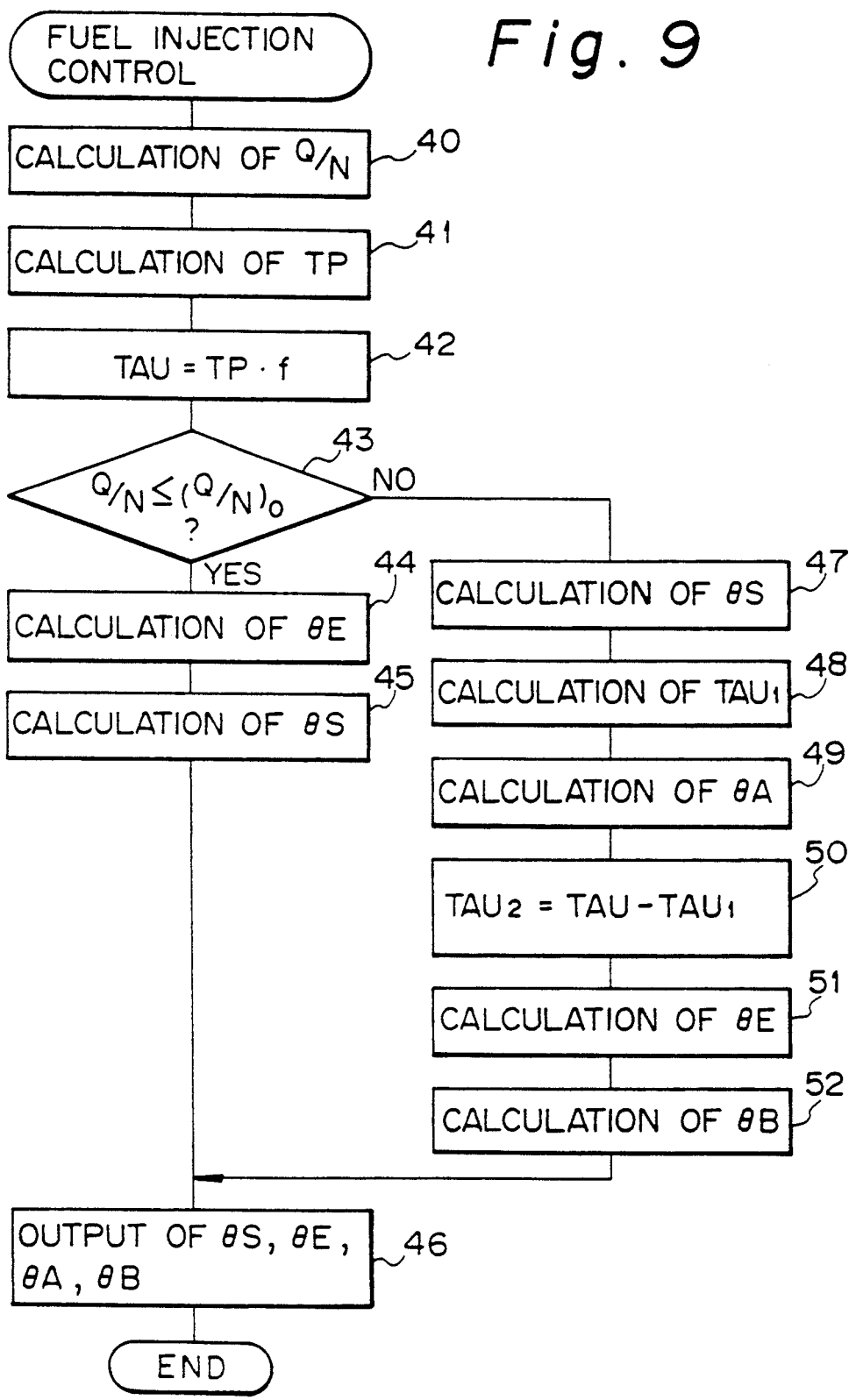
FIG. 9 is a flow chart for controlling the fuel injection.

FIG. 9 illustrates a fuel injection control routine which is processed by sequential interrupt at predetermined crankangles.

Figure 10A:
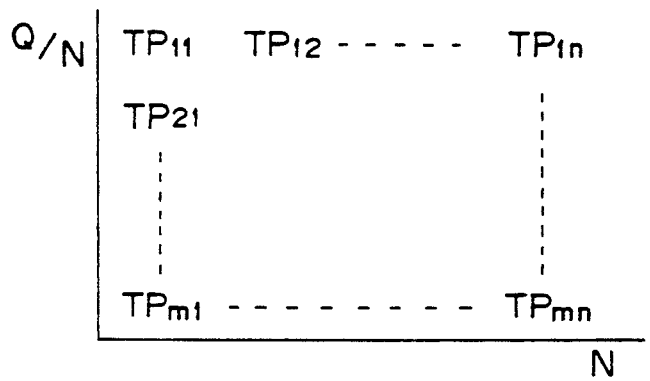
FIGS. 10A through 10C are views illustrating the maps stored in the ROM.
Figure 10B:
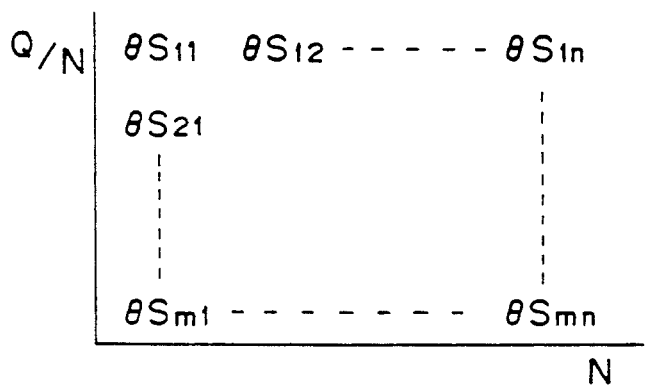
Figure 10C:
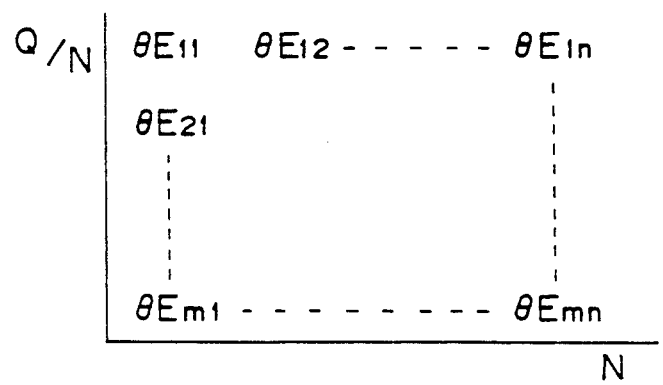

Referring to FIG. 9, in step 40, the engine load Q/N is calculated on the basis of signals output from the air flow meter 22 and the crankangle sensor 28, and then in step 41, the basic fuel injection time TP is calculated from the map illustrated in FIG. 10A. This basic fuel injection time TP is a function of the engine load Q/N and the engine speed N, and the relationship illustrated in FIG. 10A is stored in the ROM 32. Then, in step 42, the fuel injection time TAU is calculated by multiplying the basic fuel injection time TP by the correction coefficient f, and in step 44, it is determined whether or not the engine load Q/N is lower the fixed engine load $(Q/N)_0$ illustrated in FIG. 6. If $Q/N \leq (Q/N)_0$, the routine goes to step 44, and the fuel injection completion time $\theta E$ of the fuel injection $I_l$ is calculated. This fuel injection completion time $\theta E$ is stored in the ROM 32 as a function of the engine load Q/N and the engine speed N, as illustrated in FIG. 10C. Then, in step 45, the fuel injection start time $\theta S$ of the fuel injection $I_l$ is calculated from the fuel injection completion time $\theta E$, the fuel injection time TAU and the engine speed N, and in step 46, $\theta S$ and $\theta E$ are output to the output port 36.

If $Q/N > (Q/N)_0$, the routine goes to step 47 and the fuel injection start time $\theta S$ of the first fuel injection $Ih_1$ is calculated. This fuel injection start time $\theta S$ is stored in the ROM 32 as a function of the engine load Q/N and the engine speed N, as illustrated in FIG. 10B. Then, in step 48, the fuel injection time TAU1 of the first fuel injection $Ih_1$ is calculated. This fuel injection time TAU1 is obtained, for example, by multiplying the fuel injection time TAU by a fixed rate. Then, in step 49, the fuel injection completion time $\theta A$ is calculated from the fuel injection start time $\theta S$, the fuel injection time TAU1 and the engine speed N, and in step 50, the fuel injection time TAU2 of the second fuel injection $Ih_2$ is calculated by subtracting TAU1 from TAU. Then, in step 51, the fuel injection completion time $\theta E$ of the second fuel injection $Ih_2$ is calculated from the map illustrated in FIG. 10C, and stored in the ROM 32, and in step 52, the fuel injection start time $\theta B$ of the second fuel injection $Ih_2$ is calculated from the fuel injection completion time $\theta E$, the fuel injection time TAU2 and the engine speed N. Then, in step 46, $\theta S$, $\theta E$, $\theta A$ and $\theta B$ are output to the output port 36.

FIGS. 11 through 15C illustrate another embodiment.

Figure 11:
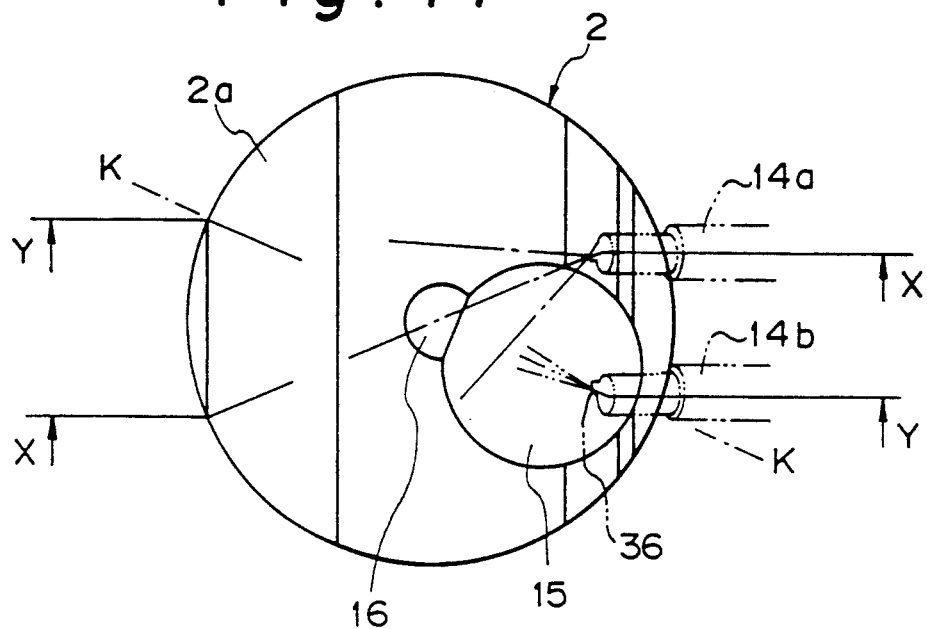
FIG. 11 is a plan view of the piston of another embodiment of a two-stroke engine.
Figure 12:
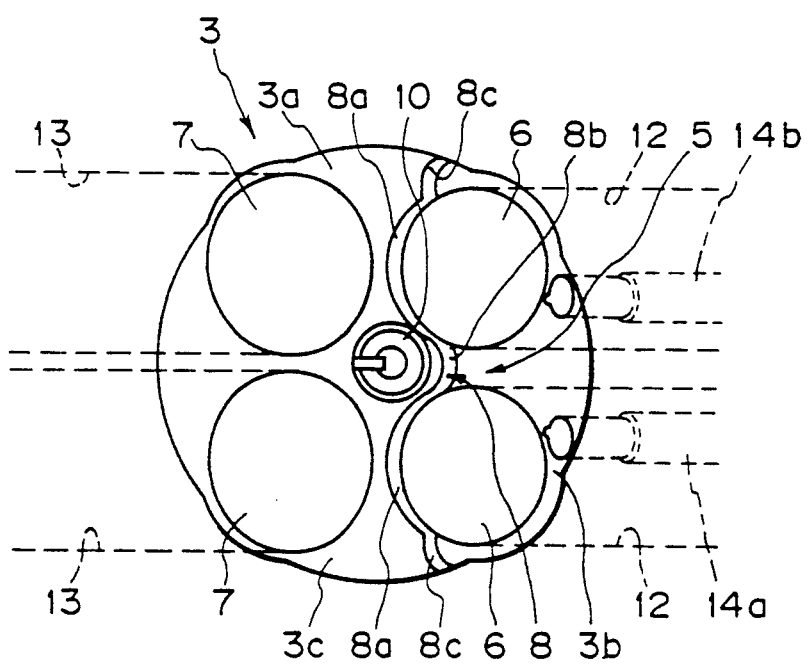
FIG. 12 is a view illustrating an inner wall of a cylinder head.

Referring to FIGS. 11 and 12, in this embodiment two fuel injectors, i.e., a first fuel injector 14a and a second fuel injector 14b, are arranged on the peripheral portion of the inner wall 3a of the cylinder head 3 near the corresponding intake valves 6. Also, in this embodiment, the depression 15 and the recessed portion 16 having a shape which is the same as that of the depression 15 and the recessed portion 16, as illustrated in FIGS. 2 and 3, are formed on the top face of the piston 2. In this embodiment, however the depression 15 is arranged so that it extends from a point beneath the spark plug 10 to a point beneath the tip portion of the second fuel injector 14b.

Further, in this embodiment, the first fuel injector 14a has a wide injection spray angle, and the second fuel injector 14b has a narrow injection spray angle.

Figure 13A:
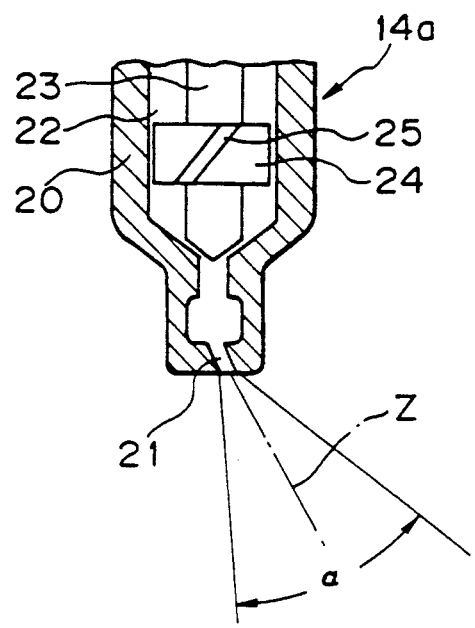
FIG. 13A and 13B are enlarged cross-sectional side views of the tip portions of fuel injectors.
Figure 13B:
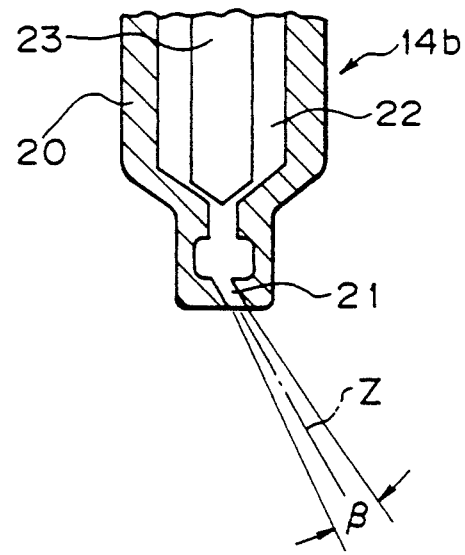

FIG. 13A illustrates an example of the tip portion of the first fuel injector 14a which can obtain a wide injection spray angle, and FIG. 13B illustrates an example of the tip portion of the second fuel injector 14b which can obtain a narrow injection spray angle.

Referring to FIGS. 13A and 13B, reference numeral 20 designates a nozzle body, 21 a nozzle bore, 22 a fuel passage, and 23 a needle actuated by a solenoid (not shown). When the solenoid is energized, and thus the needle 23 is moved upward, fuel is injected from the nozzle bore 21. As illustrated in FIG. 13A, in the first fuel injector 14a, an enlarged portion 24 is integrally formed on the needle 23, and an obliquely extending groove 25 is formed on the outer wall of the enlarged portion 24. Consequently, after fuel has passed the groove 25, the fuel swirls in the fuel passage 22 about the needle 23, and thus the fuel is injected while swirling about the injection axis Z from the nozzle bore 21. As a result, as illustrated in FIG. 13A, the injection spray angle $\alpha$ becomes wide. Conversely, as illustrated in FIG. 13B, in the second fuel injector 14b, an enlarged portion is not formed on the needle 23. Accordingly, since the fuel injected from the nozzle bore 21 does not swirl, the injection spray angle $\beta$ becomes narrow. In the examples illustrated in FIGS. 13A and 13B, the injection spray angle $\alpha$ is about 40 through 60 degrees, and the injection spray angle $\beta$ is about 5 through 10 degrees.

Also in this embodiment, in the same manner as described in the embodiment illustrated in FIGS. 1 through 10C, i.e., as illustrated in FIGS. 5 through 7, when the engine is operating under a light load, the fuel injection is carried out only once as illustrated by $I_l$, and when the engine is operating under an intermediate load or a high load, the fuel injection is carried out twice as illustrated by $Ih_1$ and $Ih_2$.

In this embodiment, however, the fuel injection Il under a light load operation of the engine and the second fuel injection $Ih_2$ under an intermediate and high load operation of the engine are carried out by the second fuel injector 14b having the narrow injection spray angle $\beta$, and the first fuel injection $Ih_1$ under an intermediate and high load operation of the engine is carried out by the first fuel injector 14a having the wide injection spray angle $\alpha$.

Figure 14A:
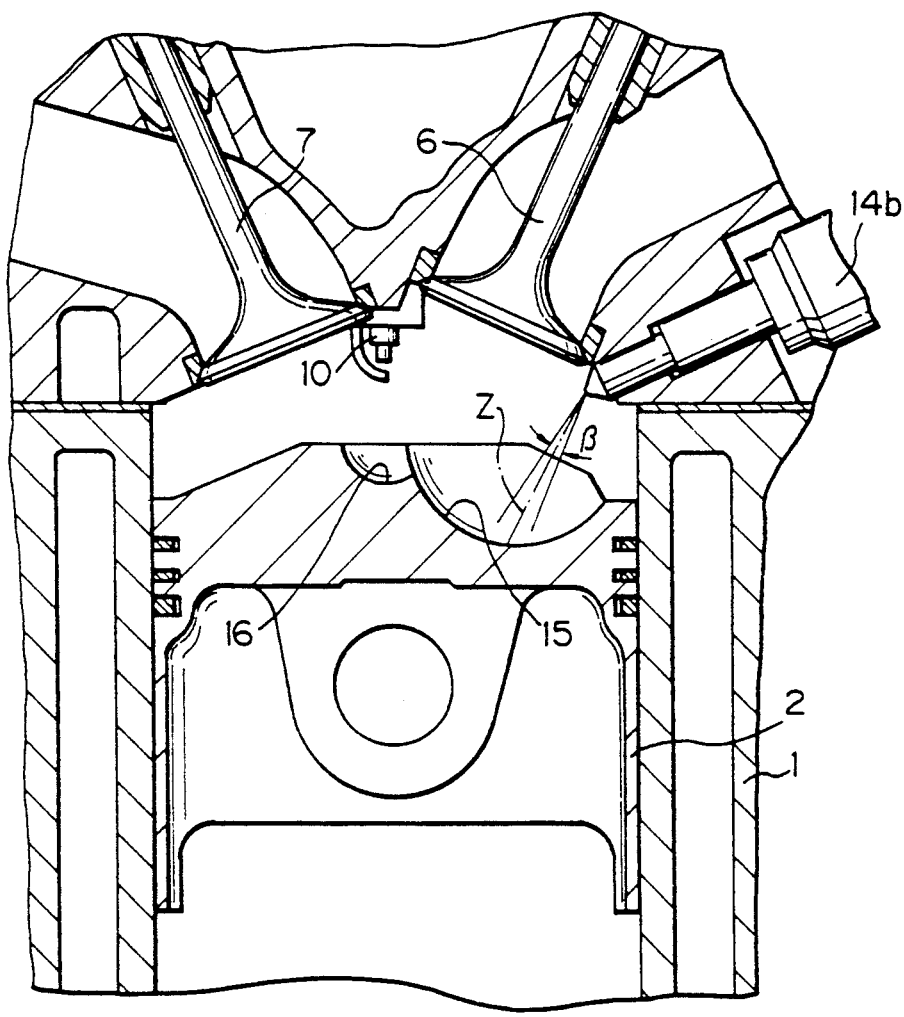
FIG. 14A is a cross-sectional side view of a cylinder of the engine, taken along the line Y—Y in FIG. 11.

In this embodiment, when the engine is operating under a light load, fuel is injected from the second fuel injector 14b toward the depression 15, so that the injected fuel moves forward along the vertical plane K—K as illustrated in FIGS. 11 and 14A. At this time, in the same manner as described with reference to FIG. 8B, the injected fuel moving forward along the axis of injection Z impinges obliquely upon the concaved inner wall of the depression 15 at an acute angle. Accordingly, the fuel moves forward, while being vaporized, to the region beneath the spark plug 10 along the concaved inner wall of the depression 15 due to the inertia thereof, and the fuel is then introduced into the recessed portion 16. As a result, an ignitable air-fuel mixture is formed around the spark plug 10.

As mentioned above, the injection spray angle $\beta$ of the second fuel injection 14b is narrow, and thus all of the fuel injected by the second fuel injector 14b is captured by the depression 15. Namely, there is no danger that the injected fuel will spread in the combustion chamber 4 to portions other time an the depression 15. Consequently, even if the amount of fuel injected by the second fuel injector 14b is small, because the engine is operating under a light load, an ignitable air-fuel mixture is formed around the spark plug 10 as mentioned above.

When the engine load Q/N becomes higher than the fixed engine load $(Q/N)_0$ (FIG. 6), i.e., when the engine is operating under an intermediate load or a heavy load, the fuel injection is carried out twice as illustrated by $Ih_1$ and $Ih_2$ in FIGS. 5 through 7. Namely, the first fuel injection $Ih_1$ is carried out by the first fuel injector 14a as illustrated in FIG. 14B, and the second fuel injection $Ih_2$ is carried out by the second fuel injector 14b as illustrated in FIG. 14C.

Figure 14B:
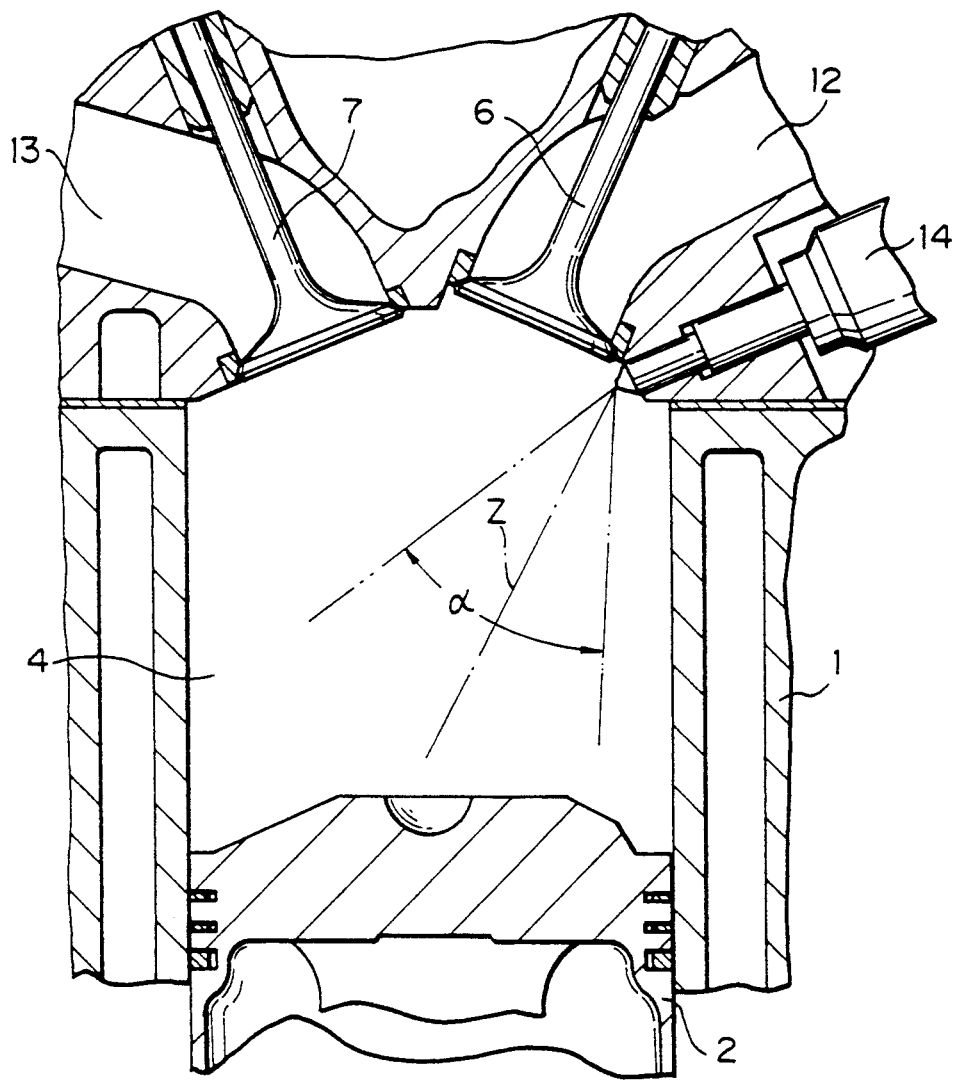
FIG. 14B is a cross-sectional side view of a cylinder of the engine, taken along the line X—X in FIG. 11.
Figure 14C:
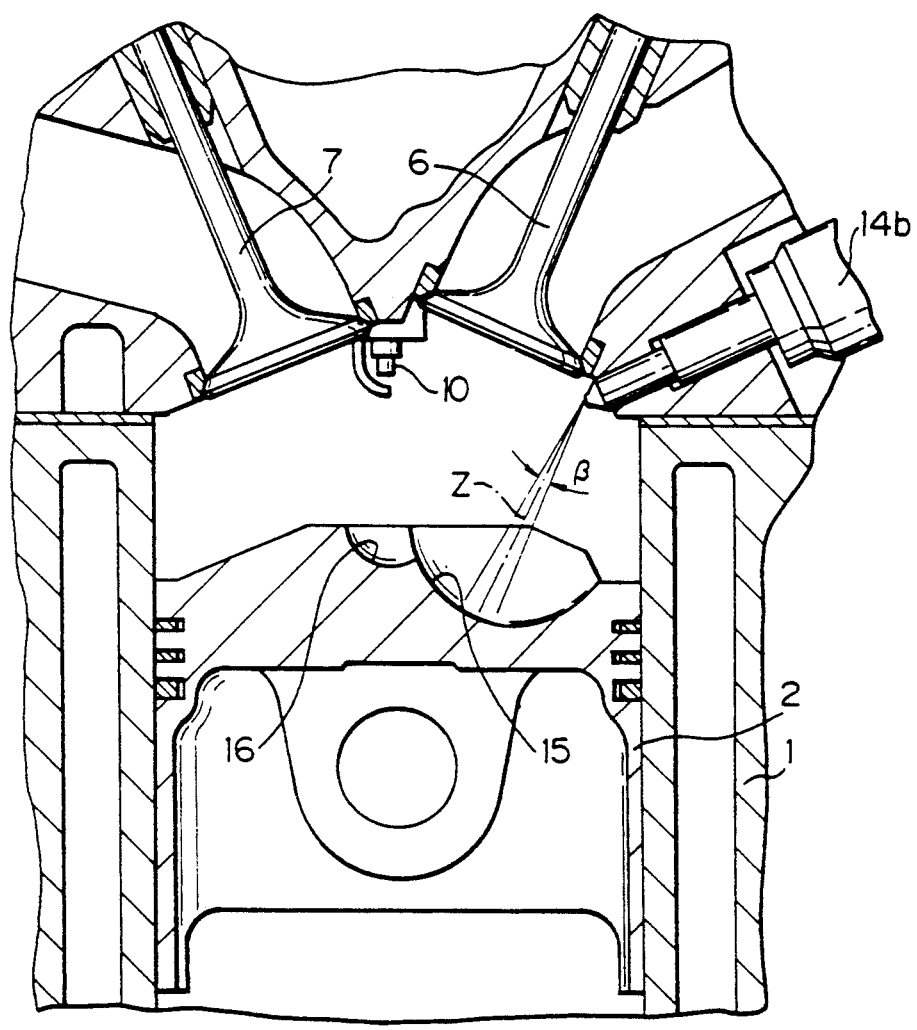
FIG. 14C is a cross-sectional side view of a cylinder of the engine, taken along the line Y—Y in FIG. 11.

Also in this embodiment, in the same manner as in the embodiment illustrated in FIG. 1 through 10C, the first fuel injection $Ih_1$ is carried out approximately when the exhaust valves 7 are closed, but in this embodiment, the injection spray angle $\alpha$ of the first fuel injector 14a is wide as illustrated in FIG. 14B. Accordingly, since the injected fuel spreads over a wide area in the combustion chamber 4, the injected fuel is sufficiently mixed with air, and thus a uniform lean air-fuel mixture is formed in the combustion chamber 4.

Thereafter, the second fuel injection $Ih_2$ by the second fuel injector 14b is started when the piston 2 is in a lower position than when the engine is operating under a light load. At this time, as illustrated in FIG. 14C, the injected fuel moves forward along the axis of injection Z and impinges upon the concaved inner wall of the depression 15 at substantially a right angle. Consequently, the fuel spreads along the concaved inner wall of the depression 15 in all directions from the point of impingement of the fuel moving along the axis of injection Z, and thus a part of the fuel, which has impinged upon the concaved inner wall of the depression 15, moves to the region beneath the spark plug 10 and is then introduced into the recessed portion 16. Namely, when the amount of fuel injected by the fuel injector 14 is large, because the engine is operating under an intermediate load or a heavy load, since a part of the injected fuel is introduced around the spark plug 10, the air-fuel mixture formed around the spark plug 10 does not become excessively rich, and thus an easily ignitable air-fuel mixture is formed around the spark plug 10. In addition, since the injection spray angle $\beta$ of the second fuel injector 14b is narrow as illustrated in FIG. 14C, all of the fuel injected by the second fuel injector 14b is captured by the depression 15. Namely, since there is no danger that the injected fuel will spread to portions of the combustion chamber 4 other than the depression 15, an easily ignitable air-fuel mixture is formed around the spark plug 10 as mentioned above.

Where the fuel injection is carried out twice by using only one fuel injector 14, as illustrated in FIGS. 1 through 10C, a rapid response is required from the injection start action and the injection complete action of the fuel injector 14. Consequently, in the embodiment illustrated in FIGS. 1 through FIG. 10C, for example, a piezoelectric element is use for driving the fuel injector 14. Nevertheless, where the fuel injection is carried out twice by using separate fuel injectors 14a and 14b as illustrated in FIGS. 11 through 14c, a rapid response is not required for the injection start action and the injection completion action of each fuel injection 14a, 14b, and therefore, in the embodiment illustrated in FIGS. 11 through 14c, solenoids can be used for driving the fuel injectors 14a and 14b.

In addition, in the embodiment illustrated in FIGS. 10 through 14c, the fuel injectors 14a and 14b are extended in parallel to each other, and accordingly, where a common main fuel pipe is used in a multi-cylinder engine, and connected to each fuel injector via a corresponding branch pipe, an advantage is obtained in that branch pipes having the same length and shape can be used for all of the fuel injectors.

Figure 15:
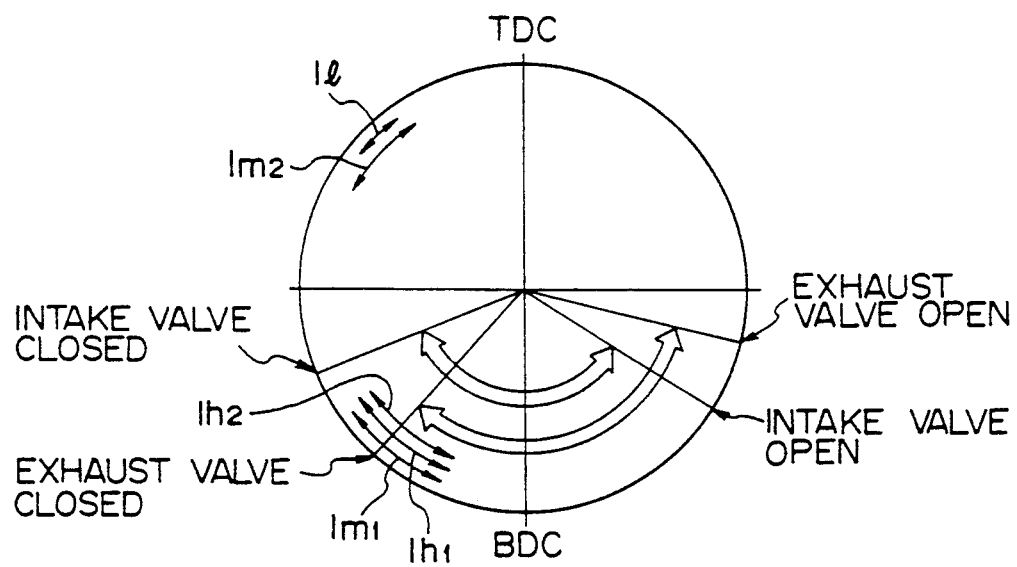
FIG. 15 is a diagram illustrating the opening time of an intake valve and an exhaust valve of a further embodiment of a two-stroke engine.
Figure 16:
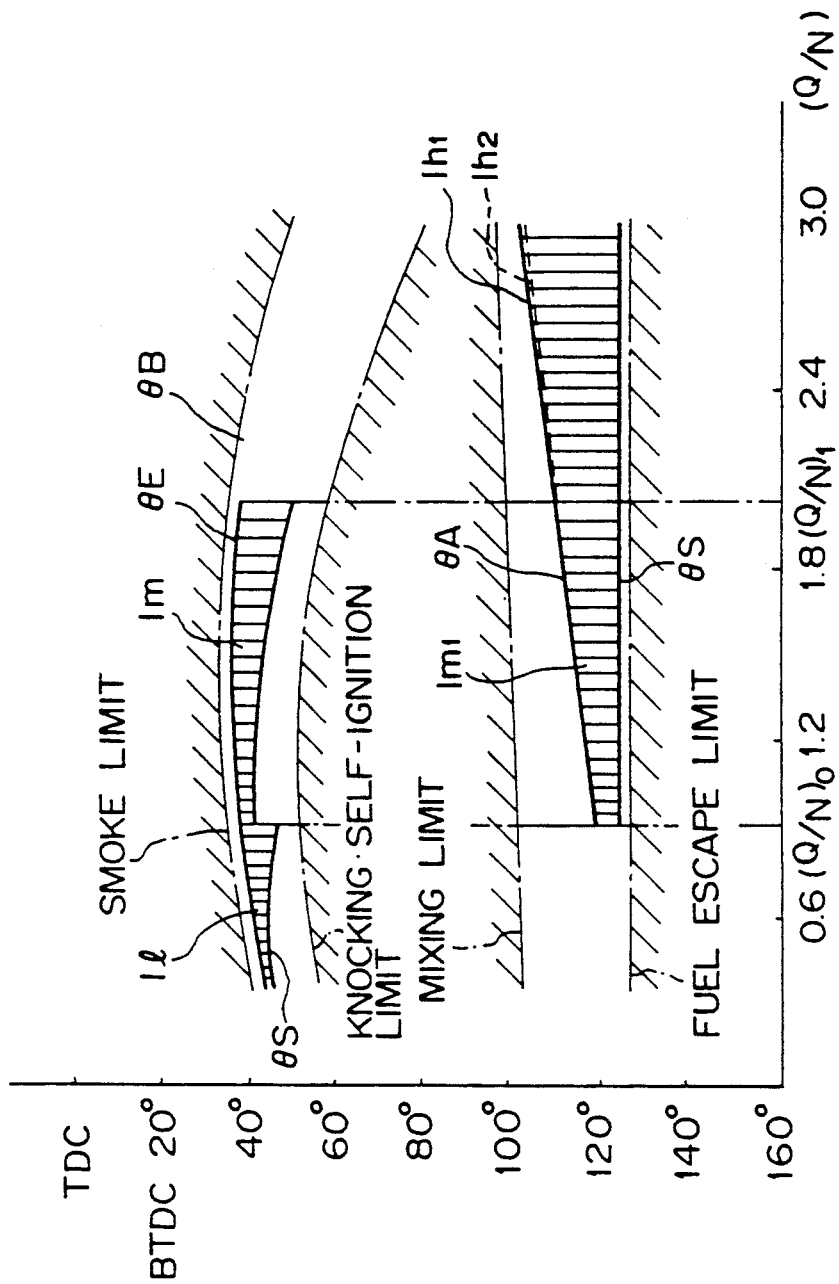
FIG. 16 is a diagram illustrating the injection time.
Figure 17:
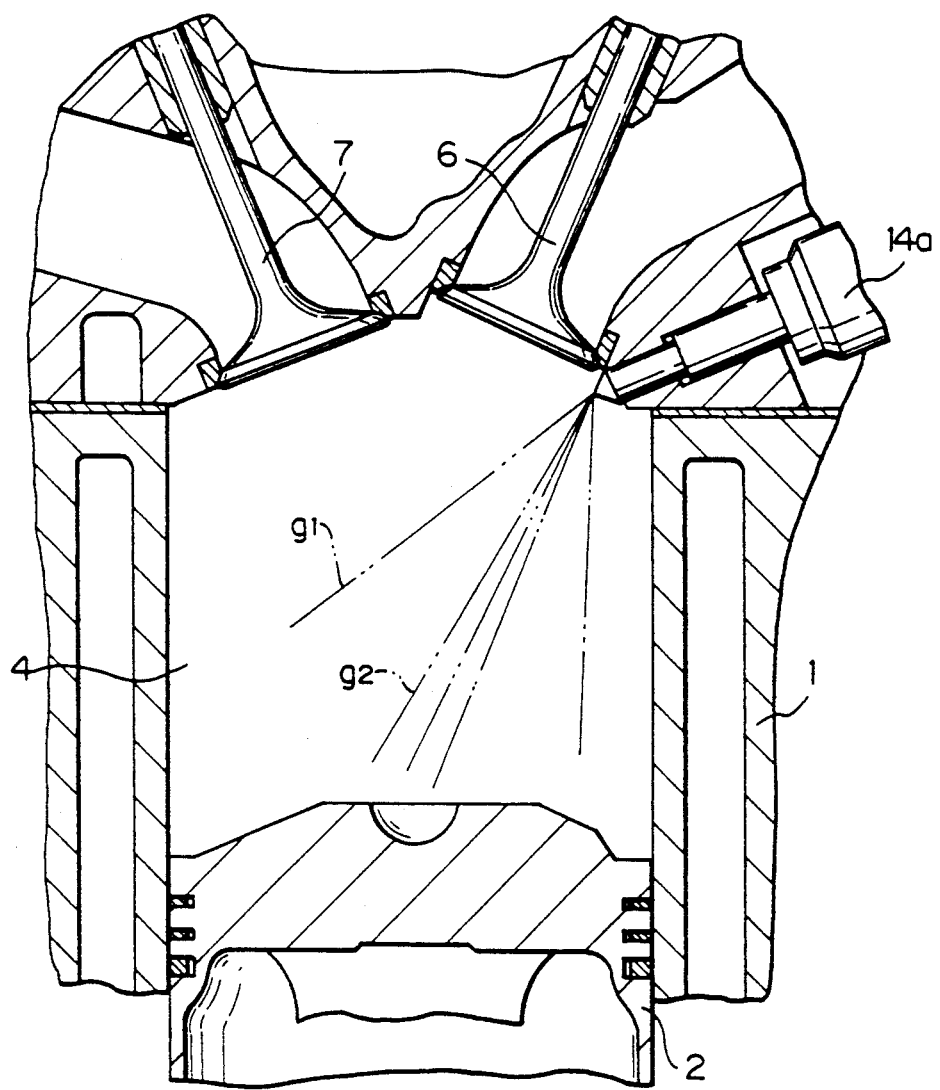
FIG. 17 is a cross-sectional side view of a cylinder of the engine, illustrating the same cross-section as shown in FIG. 14B.

FIGS. 15 through 17 illustrate a further embodiment. In this embodiment, a two-stroke engine having the same construction as that of the two-stroke engine illustrated in FIGS. 11 through 14c is used, and thus references to the drawings of the construction of the two-stroke engine are omitted.

In FIGS. 15 and 16, Il indicates an injection time set when the engine is operating under a light load; $Im_1$ and $Im_2$ indicate injection times set when the engine is operating under an intermediate load; and $Ih_1$ and $Ih_2$ indicate injection times set when the engine is operating under a heavy load. As can be seen from FIGS. 15 through 17, in this embodiment, when the engine is operating under a light load, wherein the engine load Q/N is lower than the fixed engine load $(Q/N)_0$, the fuel injection Il is carried out only once by the second fuel injector 14b as illustrated in FIG. 14A. Accordingly, the fuel injection under a light load operation of the engine is the same as that in the embodiment illustrated in FIGS. 11 and 12.

When the engine is operating under an intermediate load wherein the engine load Q/N is between $(Q/N)_0$ and $(Q/N)_1$, the fuel injection is carried out twice Namely, the first fuel injection $Im_1$ is carried out by the first fuel injector 14a approximately when the exhaust valves 7 are closed, as illustrated in FIG. 14B, and the second fuel injection $Im_2$ is carried out by the second fuel injector 14b when the piston 2 is in a higher position, as illustrated in FIG. 14c. Accordingly, at this time, also the fuel injections are the same as in the embodiment illustrated in FIGS. 11 and 12. Conversely, when the engine is operating under a heavy load, wherein the engine load Q/N is higher than $(Q/N)_1$, the fuel injections by the fuel injectors 14a and 14b are carried out at almost the same time and approximately when the exhaust valves 7 are closed. Namely, as illustrated in FIG. 17, the fuel injection $g_1$ by the first fuel injection 14a and the fuel injection $g_2$ by the second fuel injector 14b (not shown in FIG. 17) are carried out at almost the same time.

In this embodiment, when the engine is operating under a heavy load, and thus the amount of injected fuel is large, since all of the fuel is injected when the piston 2 is in a lower position, the injected fuel can be sufficiently vaporized before the ignition by the spark plug 10 is carried out. In addition, as mentioned above with reference to FIG. 19, the thermal energy of the residual burned gas becomes low when the engine is operating under a heavy load, and according, even if all of the fuel is injected early, there is no danger that knocking and self-ignition will occur.

Figure 18:
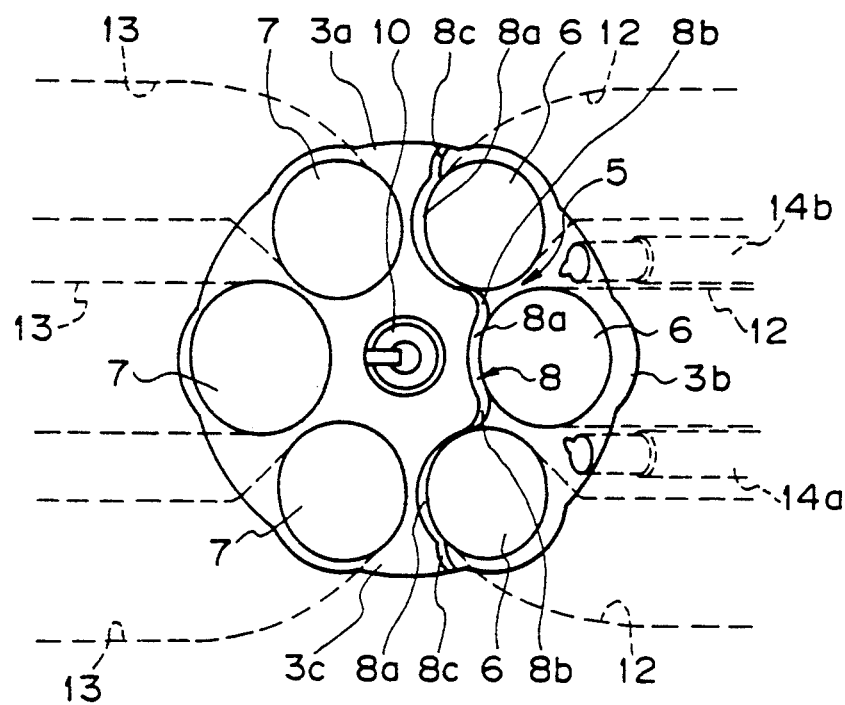
FIG. 18 is a view illustrating an inner wall of a cylinder head of a still further embodiment of a two-stroke engine.

In the embodiments described above, the two stroke engines have two intake valves 6 and two exhaust valves 7, but the present invention may be applied to a two-stroke engine having three intake valves 6 and three exhaust valves 7, as illustrated in FIG. 18.

According to the present invention, a good combustion can be obtained without an escape of fuel, the occurrence of knocking and self-ignition, and a generation of smoke.

While the invention has been described by reference to specific embodiments chosen for purposes of illustration, it should be apparent that numerous modifications could be made thereto by those skilled in the art without departing from the basic concept and scope of the invention.

We claim:

1. A two-stroke engine comprising:
   a cylinder head having an inner wall;
   a piston having a top face having therein a depression with a concaved inner wall, the inner wall of said cylinder head and the top face of said piston defining a combustion chamber therebetween;
   at least one intake valve arranged on the inner wall of said cylinder head;
   at least one exhaust valve arranged on the inner wall of said cylinder head;
   a spark plug arranged on the inner wall of said cylinder head;
   injection means for injecting fuel toward said combustion chamber; and
   control means for controlling an injection time of said injection means in response to an engine load, to carry out only one injection of fuel toward the concaved inner wall of said depression when the engine is operating under a light load, and to carry out two injections of fuel as a first injection and a second injection when the engine is operating under an intermediate load, said first injection being carried out approximately when said exhaust valve is closed and said second injection being carried out water than said first injection to direct fuel toward the concaved inner wall of said groove.

2. A two-stroke engine according to claim 1, wherein said control means controls a fuel injection completion time under a light load operation of the engine and a fuel injection completion time of said second injection under an intermediate load operation of the engine in response to the engine load and an engine substantially along a smoke limit crankangle indicating a crankangle limit at which smoke is generated.

3. A two-stroke engine according to claim 2, wherein said smoke limit crankangle is most retarded when the engine is operating under an intermediate load, and said smoke limit crankangle is advanced as the engine speed becomes higher.

4. A two-stroke engine according to claim 1, wherein said control means controls a fuel injection start time of said second injection under an intermediate load operation of the engine in response to the engine load and an engine speed so that said fuel injection start time does not exceed a knocking self-ignition limit crankangle indicating a crankangle limit at which knocking or self-ignition occurs.

5. A two-stroke engine according to claim 4, wherein said knocking self-ignition crankangle is most retarded when the engine is operating under an intermediate load, and said knocking self-ignition crankangle is advanced as the engine speed becomes higher.

6. A two-stroke engine according to claim 1, wherein said control means controls a fuel injection start time of said first injection under an intermediate load operation of the engine in response to an engine speed to change said fuel injection stay time substantially along a fuel escape limit crankangle indicating a crankangle limit at which fuel injected by said injection means escapes into an exhaust passage of the engine.

7. A two-stroke engine according to claim 6, wherein said fuel escape limit crankangle is advanced as the engine speed becomes higher.

8. A two-stroke engine according to claim 1, wherein said injection means has a tip portion arranged on a peripheral portion of the inner wall of said cylinder head on the intake valve side, and said spark plug is arranged at a central portion of the inner wall of said cylinder head, said depression extending from a point beneath said spark plug to a point beneath the tip portion of said injection means.

9. A two-stroke engine according to claim 8, wherein said control means controls the injection time to inject fuel at a time at which said fuel injected by said injection means and moving along an axis of injection impinges obliquely upon the concaved inner wall of said depression at an acute angle, to whereby cause an impinged fuel to flow along the concaved inner wall of said depression toward the point beneath said spark plug due to an interia thereof when the engine is operating under a light load.

10. A two-stroke engine according to claim 8, wherein said second injection under an intermediate load operation of the engine is carried out at a time at which fuel injected by said injection means and moving along an axis of injection impinges upon the concaved inner wall of said depression at substantially a right angle.

11. A two-stroke engine according to claim 8, wherein the concaved inner wall of said depression has a substantially spherical shape.

12. A two-stroke engine according to claim 11, wherein the concaved inner wall of said depression has a symmetrical shape with respect to a vertical plane including both said spark plug and said injection means.

13. A two-stroke engine according to claim 12, wherein an axis of injection is located in said vertical plane.

14. A two-stroke engine according to claim 12, wherein the top face of said piston has therein a recessed portion which is located in said vertical plane beneath said spark plug, and said recessed portion is open to an upper interior of said depression.

15. A two-stroke engine according to claim 14, wherein said recessed portion has a substantially spherical shape having a radius of curvature which is smaller than that of said depression.

16. A two-stroke engine according to claim 14, wherein said spark plug enters said recessed portion when said piston reaches top dead center.

17. A two-stroke engine according to claim 1, wherein said injection means comprises as single fuel injector.

18. A two-stroke engine according to claim 1, wherein said injection means comprises a first fuel injector and a second fuel injector, said first injection being carried out by said first fuel injector, and said second injection and an injection under a light load operation of the engine being carried out by said second fuel injector.

19. A two-stroke engine according to claim 18, wherein said second injector has a tip portion arranged on a peripheral portion of the inner wall of said cylinder head on the intake valve side, and said spark plug is arranged at a central portion of the inner wall of said cylinder head, said depression extending from a point beneath said spark plug, to a point beneath the tip portion of said second injector.

20. A two-stroke engine according to claim 18, wherein said first fuel injector has a fuel spray angle which is wider than a fuel spray angle of said second fuel injector.

21. A two-stroke engine according to claim 1, wherein said control means controls the injection time of said injection means to inject fuel twice, to thereby carry out said first injection and said second injection when the engine is operating under a heavy load.

22. A two-stroke engine according to claim 21, wherein said control means controls a fuel injection completion time of said second injection under a high load operation of the engine in response to the engine load and an engine speed to change said fuel injection completion time substantially along a smoke limit crankangle indicating a crankangle limit at which smoke is generated.

23. A two-stroke engine according to claim 22, wherein said smoke limit crankangle is most retarded when the engine is operating under an intermediate load, and said smoke limit crankangle is advanced as the engine speed becomes higher.

24. A two-stoke engine according to claim 21, wherein said control means controls a fuel injection start time of said second injection under a high load operation of the engine in response to the engine load and an engine speed so that said fuel injection start time does not exceed a knocking.self-ignition limit crankangle indicating a crankangle limit at which knocking or self-ignition occurs.

25. A two-stroke engine according to claim 24, wherein said knocking.self-ignition crankangle is most retarded when the engine is operating under an intermediate load, and said knocking.selfignition crankangle is advanced as the engine speed becomes higher.

26. A two-stroke engine according to claim 21, wherein said control means controls a fuel injection start time of said first injection under a high load operation of the engine in response to an engine speed, to change said fuel injection start time substantially along a fuel escape limit crankangle indication a crankangle limit at which fuel injected by said injection means escapes into an exhaust passage of the engine.

27. A two-stroke engine according to claim 26, wherein said fuel escape limit crankangle is advanced as the engine speed becomes higher.

28. A two-stroke engine according to claim 21, wherein said injection means comprises single fuel injector.

29. A two-stroke engine according to claim 21, wherein said injection means comprises a first fuel injector and a second fuel injector, said first injection being carried out by said first fuel injector, and said second injection and an injection under a light load operation of the engine being carried out by said second fuel injector.

30. A two-stroke engine according to claim 1, wherein said injection means comprises a first fuel injector and a second fuel injector, and said control means controls injection times of said first fuel injector and said fuel injector to inject fuel by both said first fuel injector and said second fuel injector approximately when said exhaust valve is closed when the engine is operating under a heavy load.

31. A two-stroke engine according to claim 30, wherein said control means controls fuel injection start times of said first fuel injector and said second fuel injector in response to an engine speed to change said fuel injection start times substantially along a fuel escape limit crankangle indicating a crankangle limit at which fuel injected by said first fuel injector and said second fuel injector escapes into an exhaust passage of the engine.

32. A two-stroke engine according to claim 31, wherein said fuel escape limit crankangle is advanced as the engine speed becomes higher.

33. A two-stroke engine according to claim 1, further comprising a masking wall formed on the inner wall of said cylinder head between said intake valve and said exhaust valve to mask a valve opening of said intake valve, which is located on said exhaust valve side.

34. A two-stroke engine according to claim 33, wherein said masking wall masks the valve opening of said intake valve, which is located on said exhaust valve side, for an entire time for which said intake valve is open.

35. A two-stroke engine according to claim 33, wherein said masking wall extends in an arc along the peripheral portion of said intake valve.

* * * * *